Sept. 14, 1965   S. A. GRUBISH   3,206,180
PIPE CUTTING MACHINE
Filed May 22, 1962   22 Sheets-Sheet 1

INVENTOR.
STEPHEN A. GRUBISH
BY
ATTORNEYS

Sept. 14, 1965 S. A. GRUBISH 3,206,180
PIPE CUTTING MACHINE
Filed May 22, 1962 22 Sheets-Sheet 2

*INVENTOR.*
STEPHEN A. GRUBISH
BY
ATTORNEYS

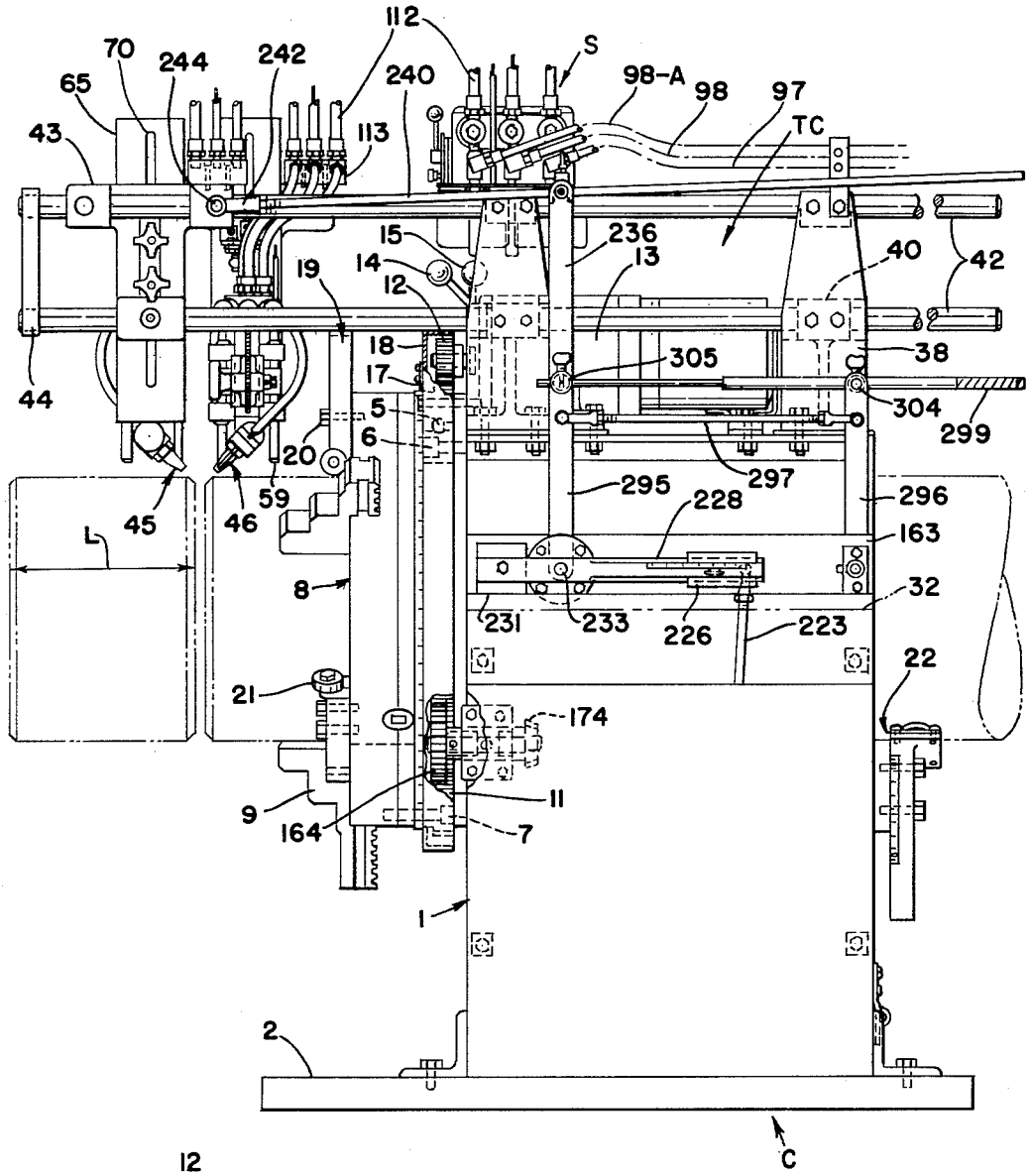
FIG. II
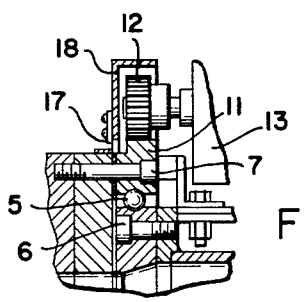
FIG. IIA

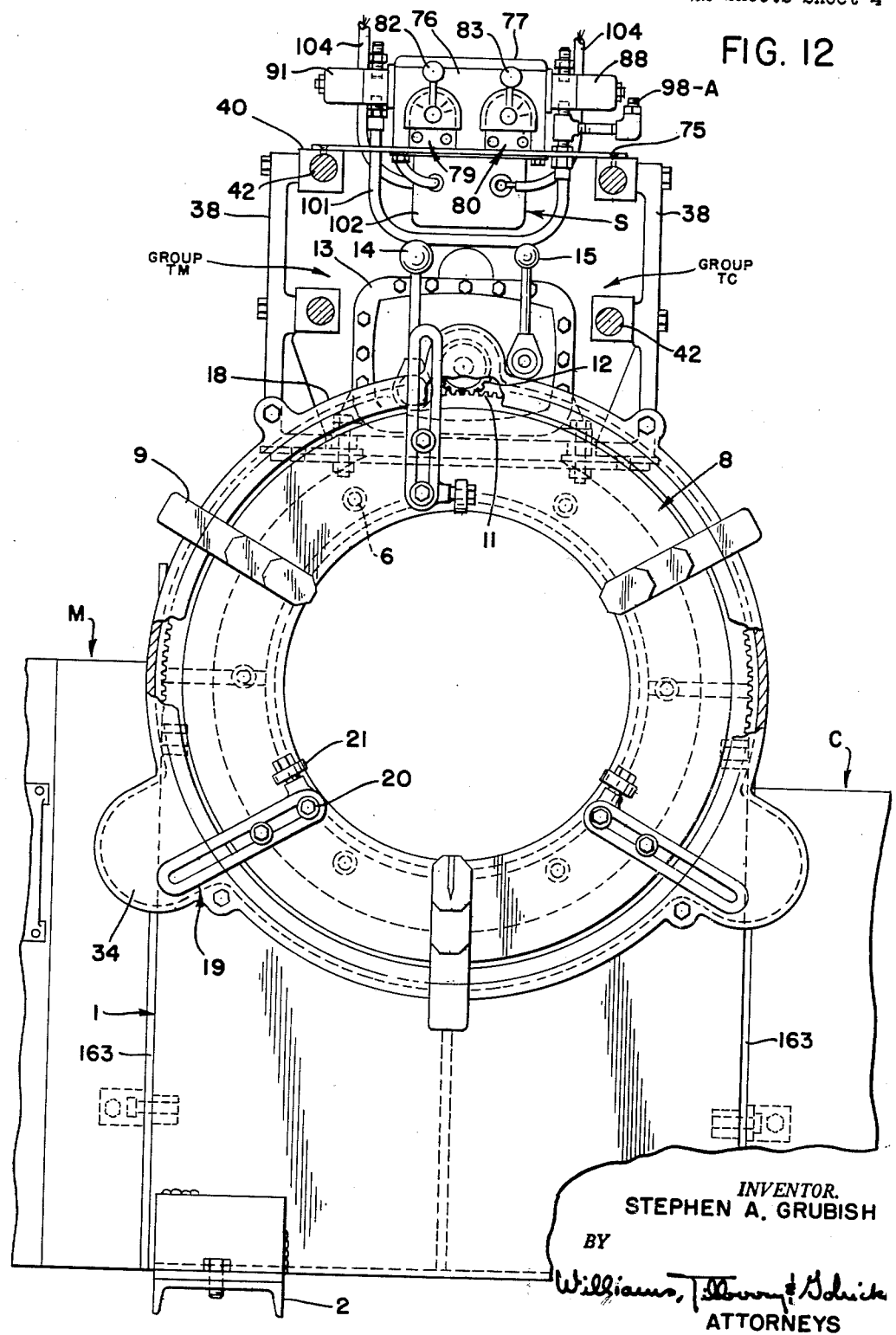

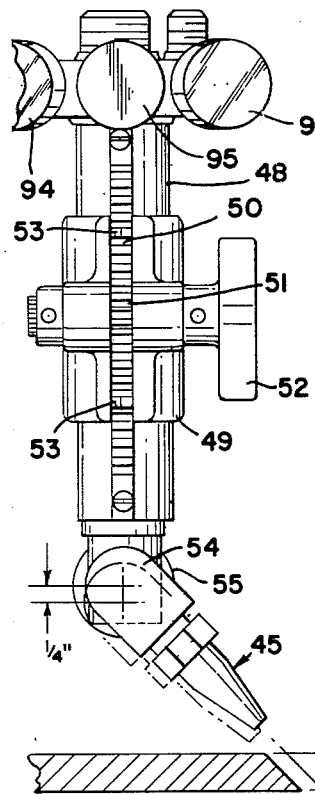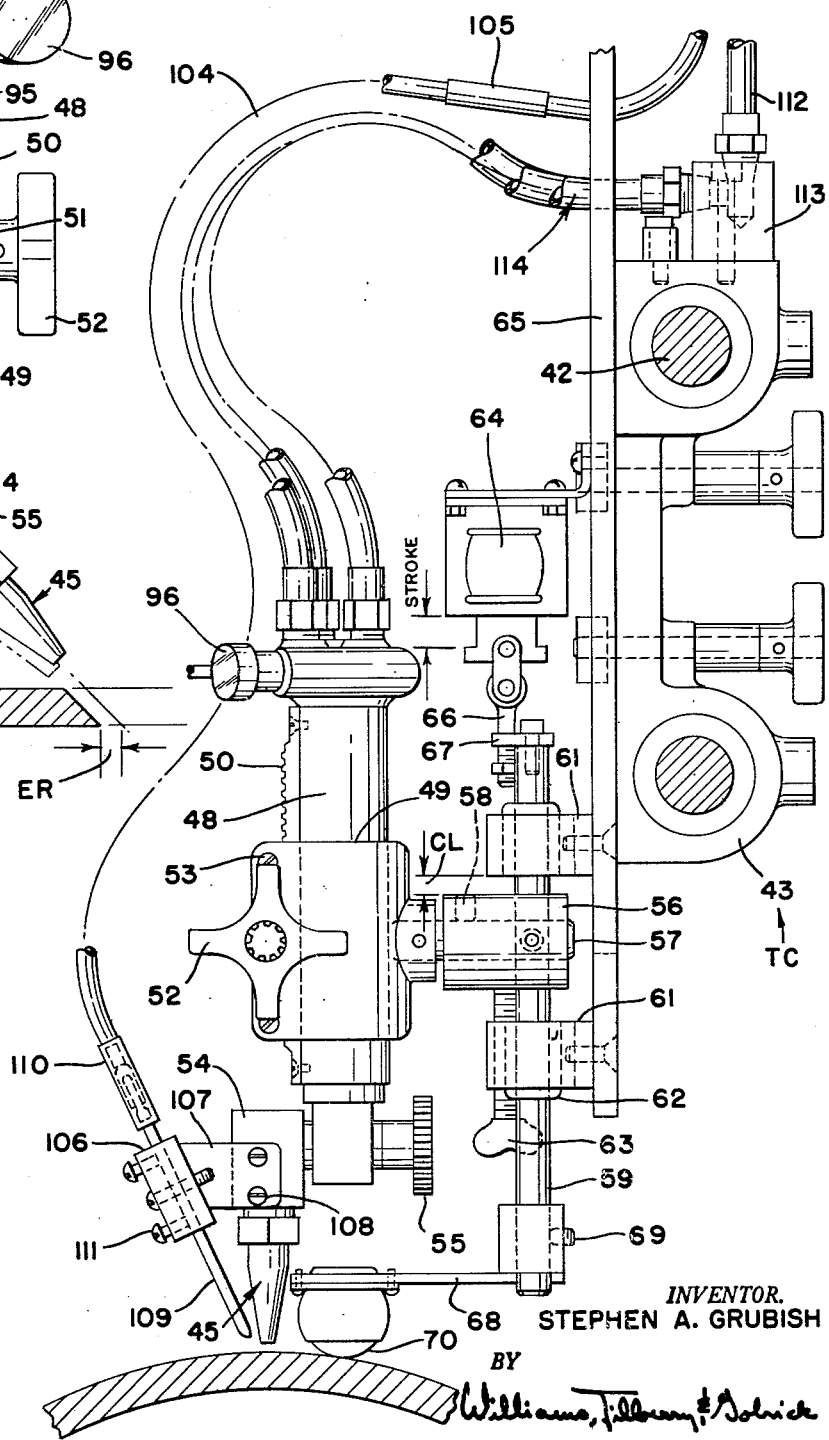

Sept. 14, 1965  S. A. GRUBISH  3,206,180
PIPE CUTTING MACHINE
Filed May 22, 1962  22 Sheets-Sheet 7
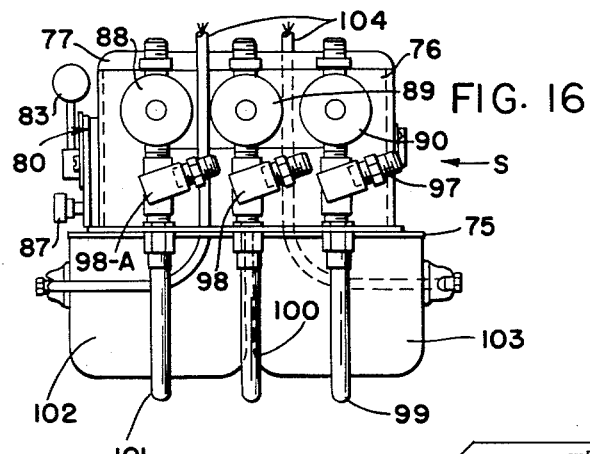
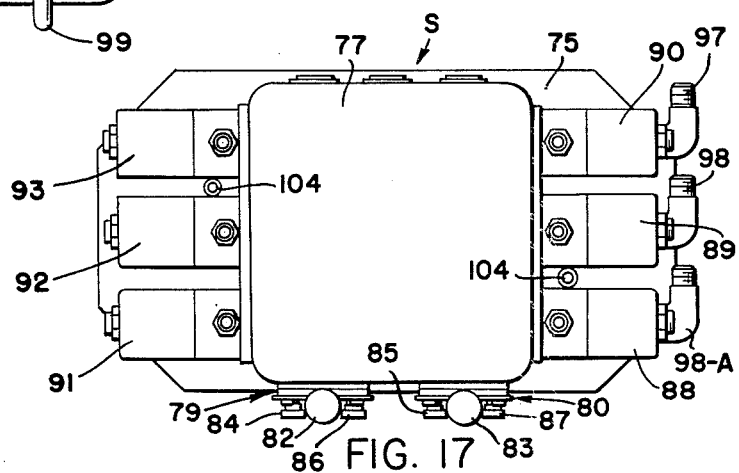
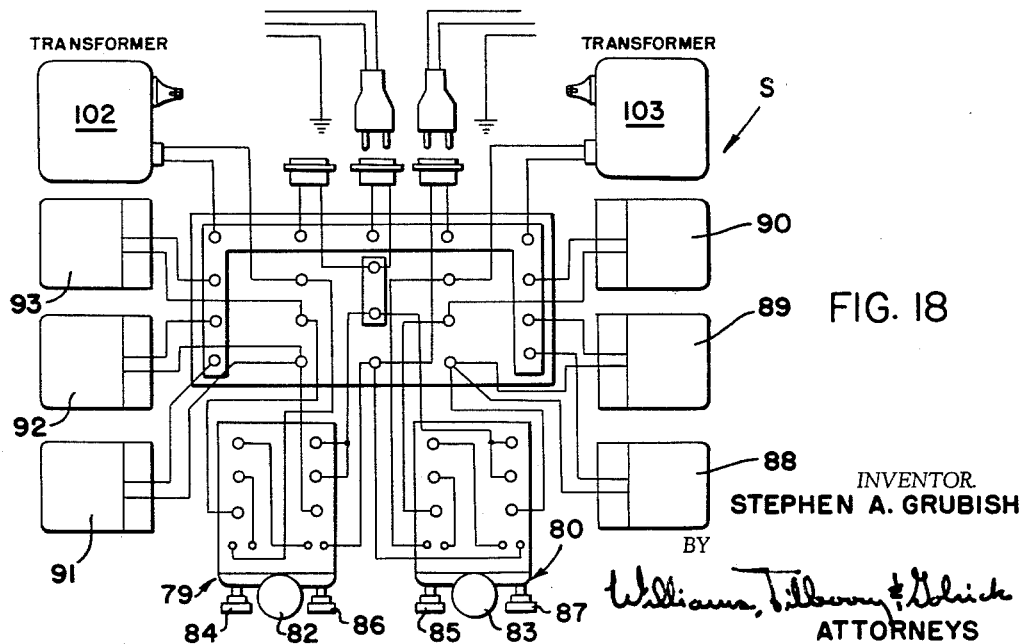
INVENTOR.
STEPHEN A. GRUBISH
BY
Williams, Tilbury & Golick
ATTORNEYS Sept. 14, 1965  S. A. GRUBISH  3,206,180
PIPE CUTTING MACHINE
Filed May 22, 1962  22 Sheets-Sheet 8

INVENTOR.
STEPHEN A. GRUBISH
BY
Williams, Illovny & Golrick
ATTORNEYS

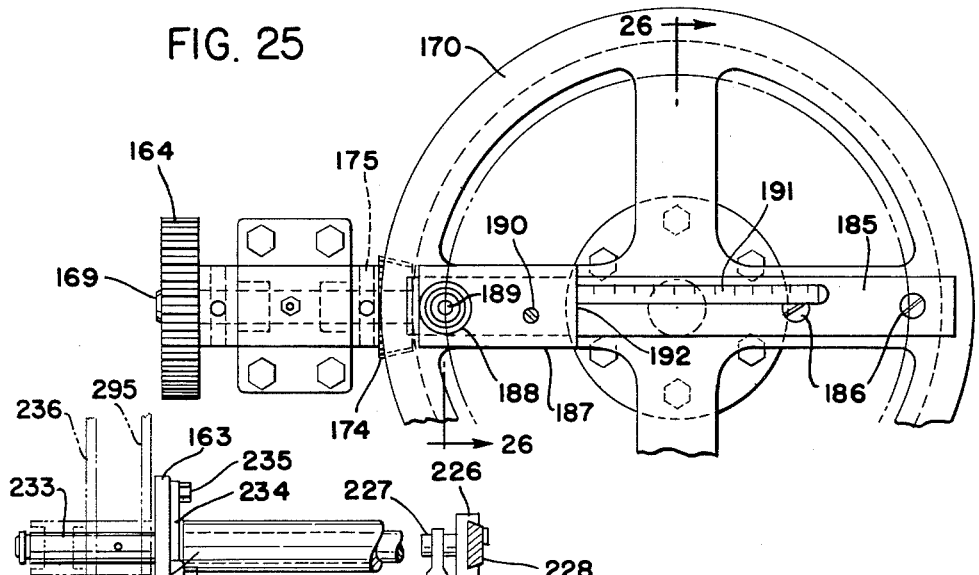
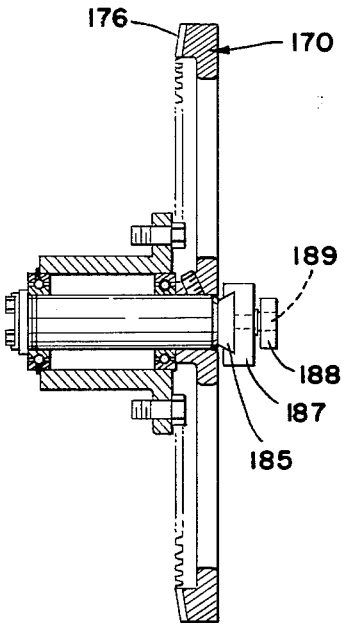
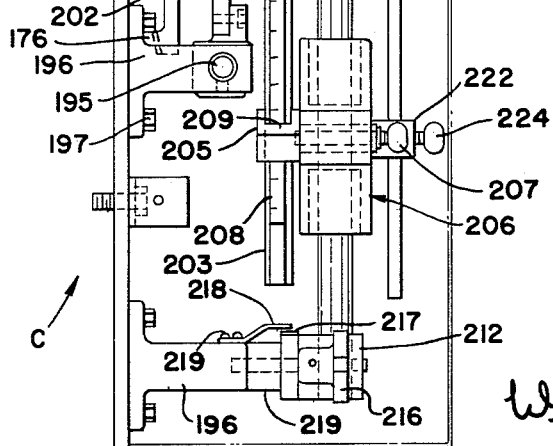

Sept. 14, 1965  S. A. GRUBISH  3,206,180
PIPE CUTTING MACHINE
Filed May 22, 1962  22 Sheets-Sheet 14

INVENTOR.
STEPHEN A. GRUBISH
BY
Williams, Allurry & Dolnick
ATTORNEYS

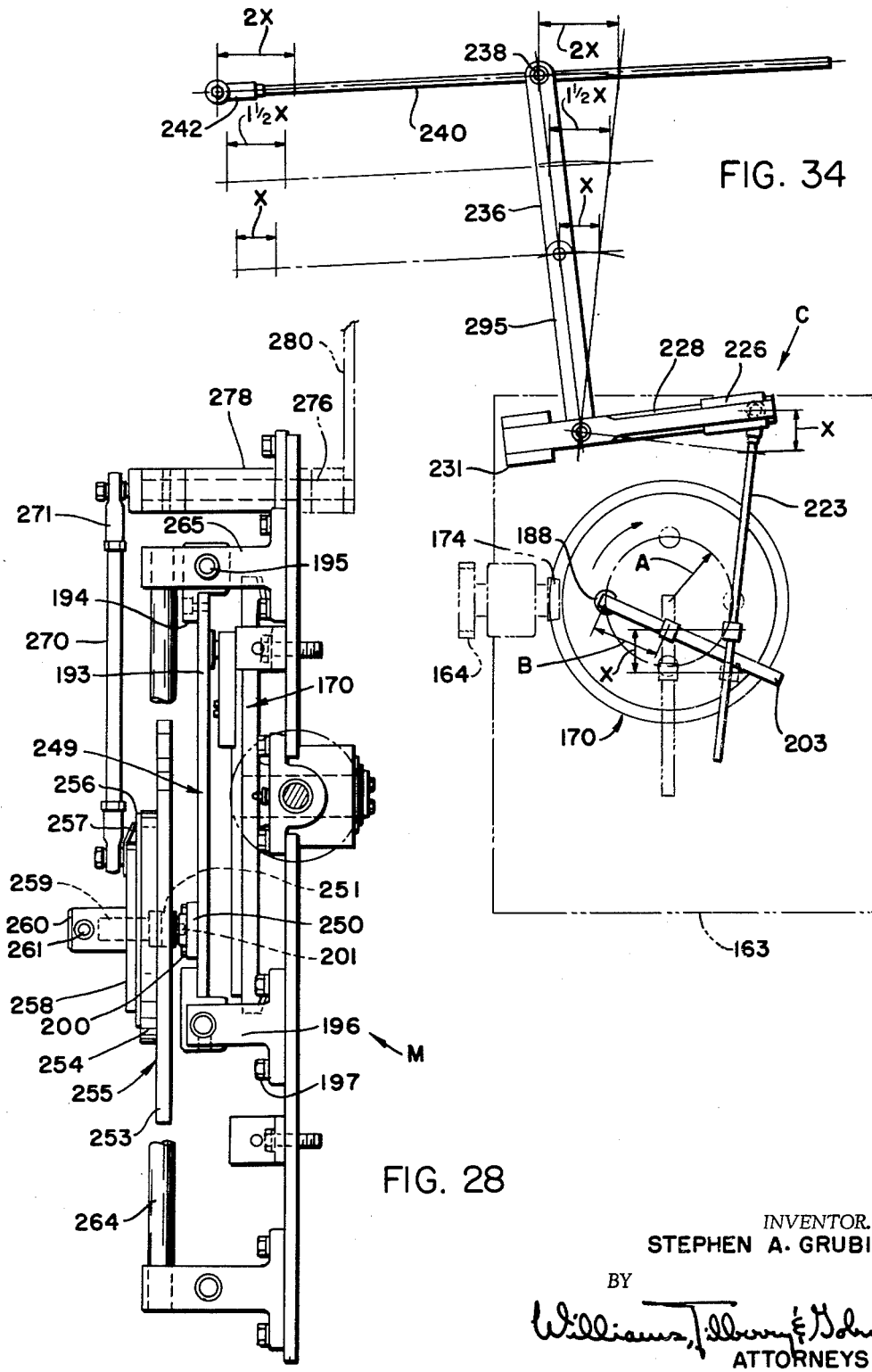

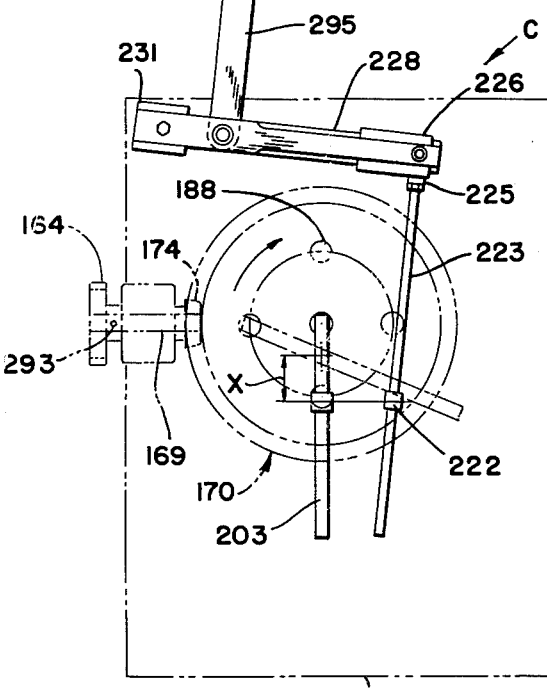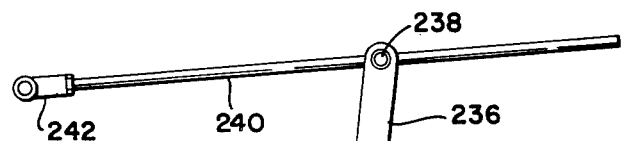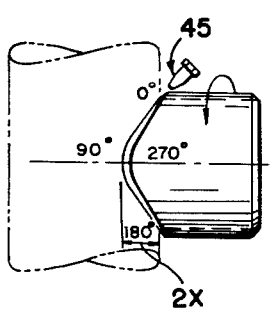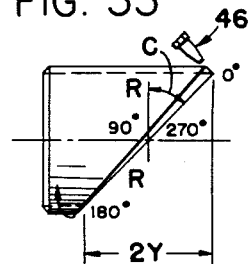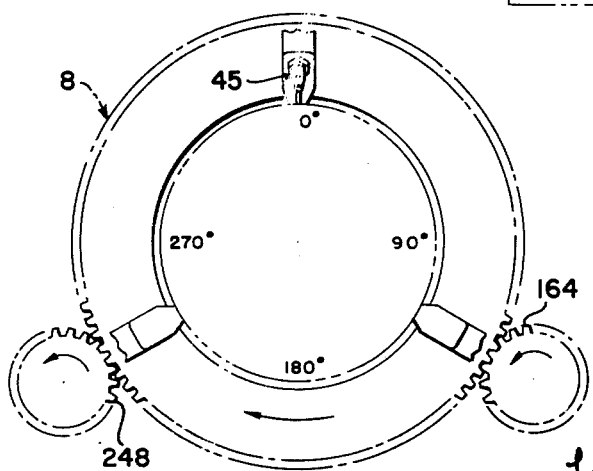

Sept. 14, 1965 S. A. GRUBISH 3,206,180
PIPE CUTTING MACHINE
Filed May 22, 1962 22 Sheets-Sheet 17

INVENTOR.
STEPHEN A. GRUBISH
BY
Williams, Tilbury & Gohrick
ATTORNEYS

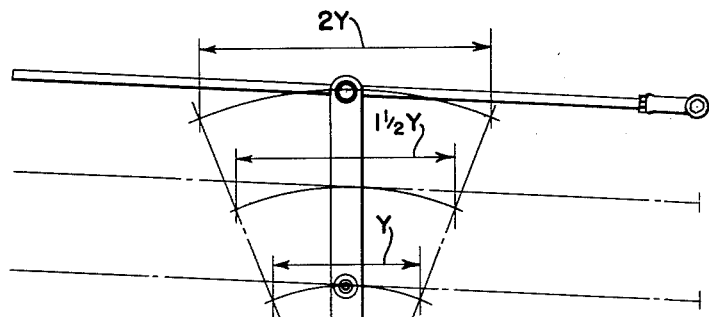
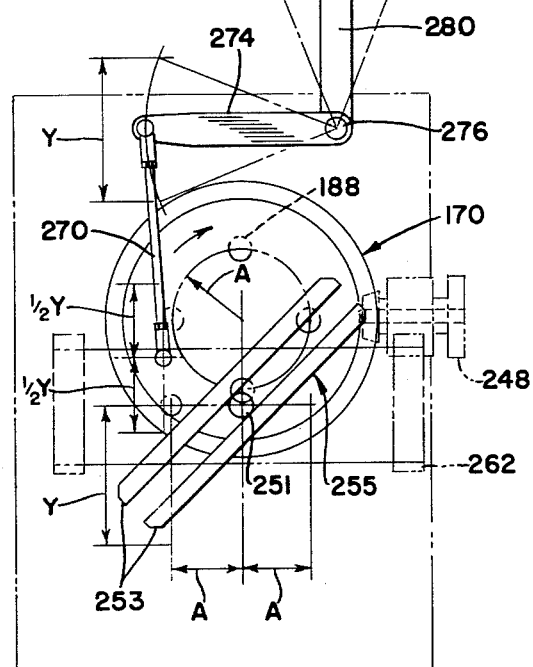
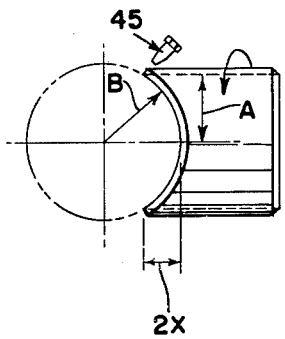
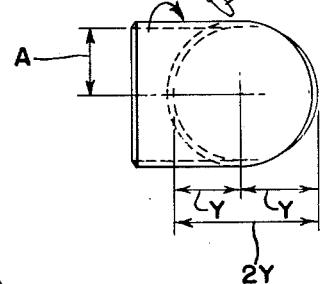
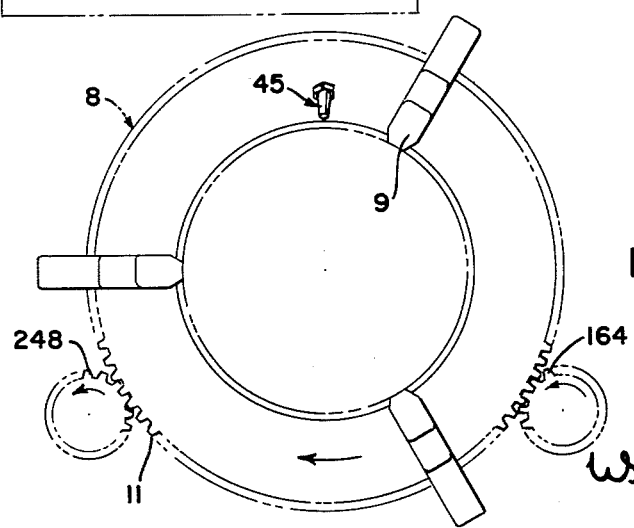

Sept. 14, 1965    S. A. GRUBISH    3,206,180
PIPE CUTTING MACHINE
Filed May 22, 1962    22 Sheets-Sheet 19
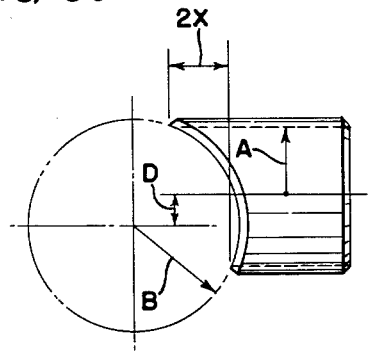
FIG. 39
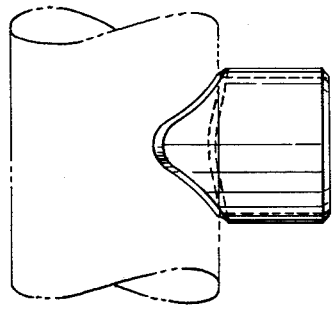
FIG. 41
FIG. 40
FIG. 40A
INVENTOR.
STEPHEN A. GRUBISH
BY
Williams, Tilbury & Gobrick
ATTORNEYS

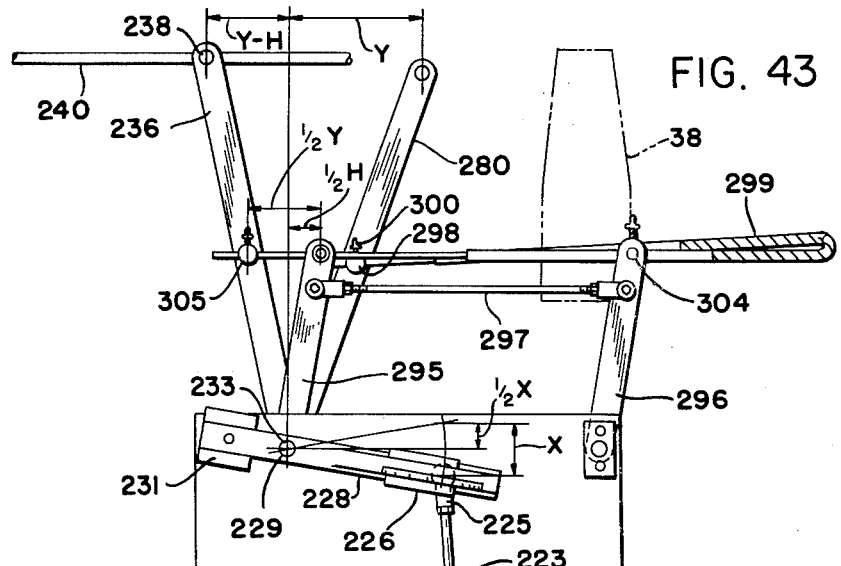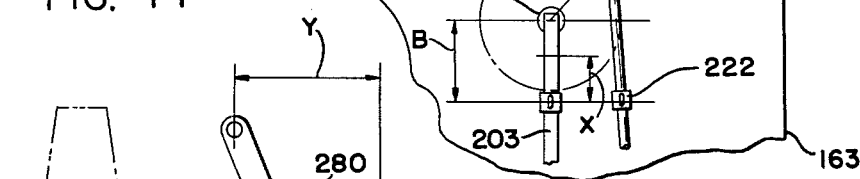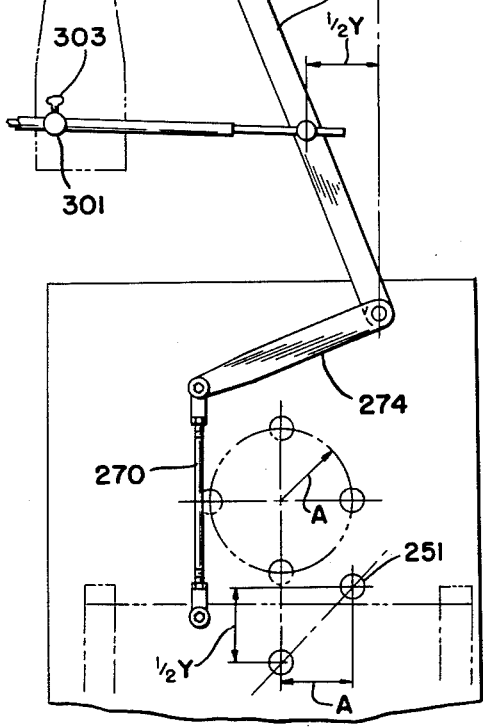

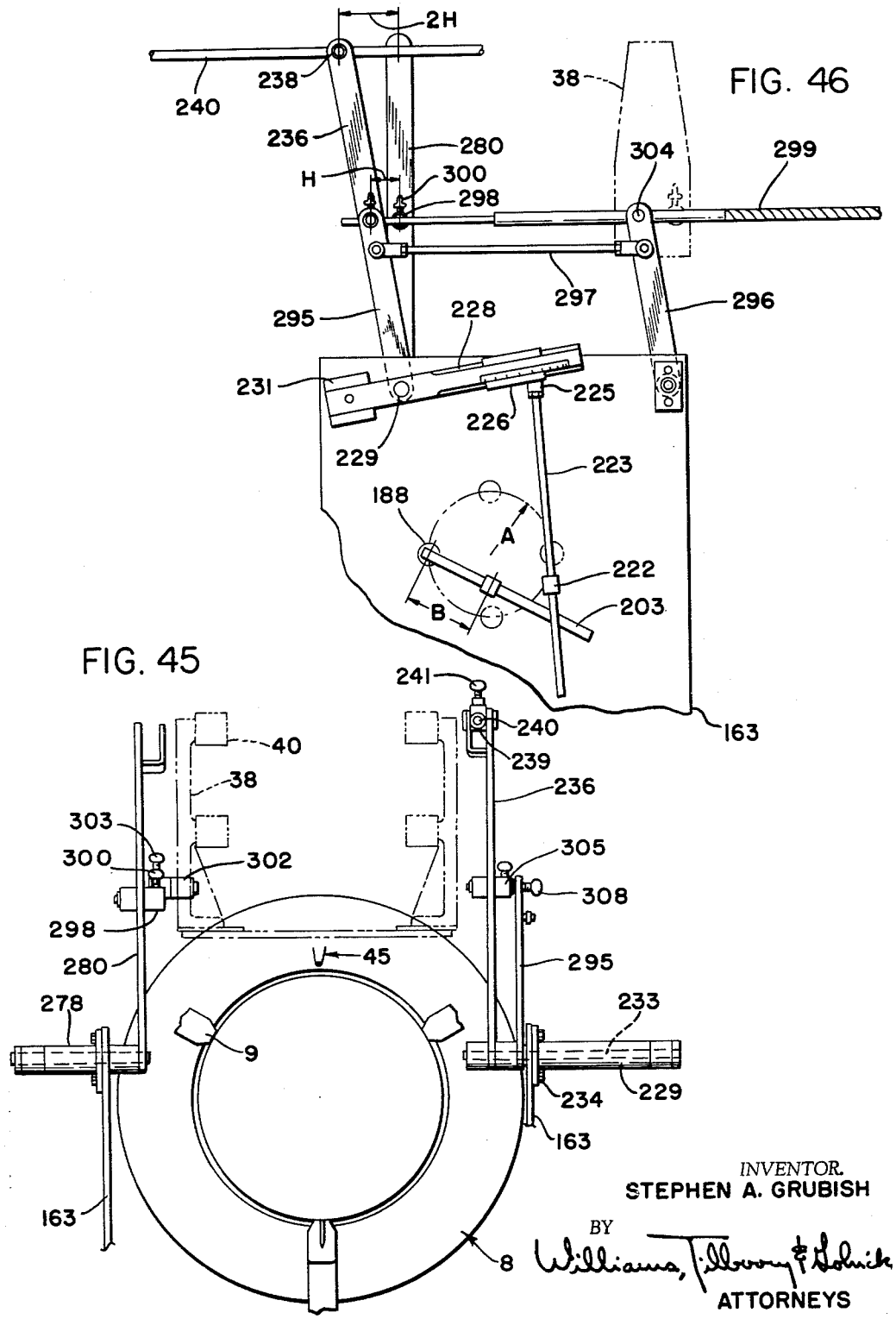

Sept. 14, 1965      S. A. GRUBISH      3,206,180

PIPE CUTTING MACHINE

Filed May 22, 1962      22 Sheets-Sheet 22

INVENTOR.
STEPHEN A. GRUBISH
BY
ATTORNEYS

United States Patent Office 3,206,180
Patented Sept. 14, 1965

3,206,180
PIPE CUTTING MACHINE
Stephan Anthony Grubish, P.O. Box 275, Salem, Ohio
Filed May 22, 1962, Ser. No. 196,719
23 Claims. (Cl. 266—23)

This invention relates to an apparatus for flame cutting cylindrical members. More specifically this invention relates to a device which is capable of making straight, mitre, contour, and compound contour and mitre cuts on pipe ends for joining one intersecting pipe to another.

An object of this invention is to provide a machine which embodies all of the necessary features required to make it the most universal tool yet devised for the preparation of intersecting tubular members, or a tubular member and a plane surface.

A further object is to arrange the separate functions of the machine in such a manner that it can be assembled on a building block or module principle.

A further object of this invention is to provide two motion-generating modules which can be used individually or in combination to produce an accurate curve of intersection of intersecting cylinders.

A further object of this invention is to provide means whereby the motion produced by the aforesaid modules may be multiplied to produce the motion required to operate a number of larger capacity machines.

Other objects and advantages of the invention will appear in the following description when read in conjunction with the drawings in which:

FIGURE 11 is a side elevational view of the entire machine equipped with the linkage and cable assembly.

FIGURE 11A is a cross-sectional view of the chuck driving mechanism.

FIGURE 12 is a front elevational view of the machine shown in FIGURE 11.

FIGURE 14 shows a front elevational view of the torch carrier group, illustrating the floating holder for the torch.

FIGURE 15 is a fragmentary side view of the torch with a portion in phantom showing the torch dropped down ¼ inch.

FIGURE 16 is a side elevational view of the solenoid control box.

FIGURE 17 is a plan view of the solenoid control box shown in FIGURE 16.

FIGURE 18 is a schematic wiring diagram for connection of all components in the control group.

FIGURE 24 is a side elevational view of the contour-motion module shown in FIGURE 23.

FIGURE 25 is a detail front elevational view of the motion-producing gear train shown in FIGURES 23 and 24.

FIGURE 26 is a sectional view taken on the line 26—26 of FIGURE 25.

FIGURE 28 is a side elevational view of the mitre-motion module shown in FIGURE 27.

FIGURE 29 is a schematic diagram of the contour module.

FIGURE 31 is a schematic representation of the pipe chuck.

FIGURE 32 illustrates a pipe T-joint.

FIGURE 33 illustrates a pipe 45° mitre cut.

FIGURE 34 is another schematic diagram of the contour-motion module illustrating motion development for cutting a T-joint.

FIGURE 35 is another schematic diagram of the mitre-motion module illustrating motion development for cutting a 45° mitre.

FIGURE 36 is another schematic illustration of the pipe chuck showing rotational directions.

FIGURE 37 is another schematic illustration of a T-joint cut with dimensional settings shown.

FIGURE 38 is another schematic illustration of a 45° mitre cut with dimensional settings shown.

FIGURE 39 is a schematic illustration of an off-center T-joint with settings shown.

FIGURE 40 is a front elevational view of the contour-motion module positioned to make an off-center cut.

FIGURE 40A is an enlarged view of the transverse scale on the mitre-motion module.

FIGURE 41 is a top plan view of the off-center T-joint of FIGURE 39.

FIGURE 42 is a schematic representation of a lateral pipe intersection with dimensional settings illustrated.

FIGURE 43 is a schematic representation of the contour-motion module showing the position for development of a lateral joint.

FIGURE 44 is a schematic representation of the mitre-motion module showing the position for development of a lateral joint.

FIGURE 45 is a front elevational view of the chuck and linkage arrangement shown in FIGURES 43 and 44.

FIGURE 46 is a schematic representation of the contour-motion module advanced 90° from FIGURE 43.

Figure 13:
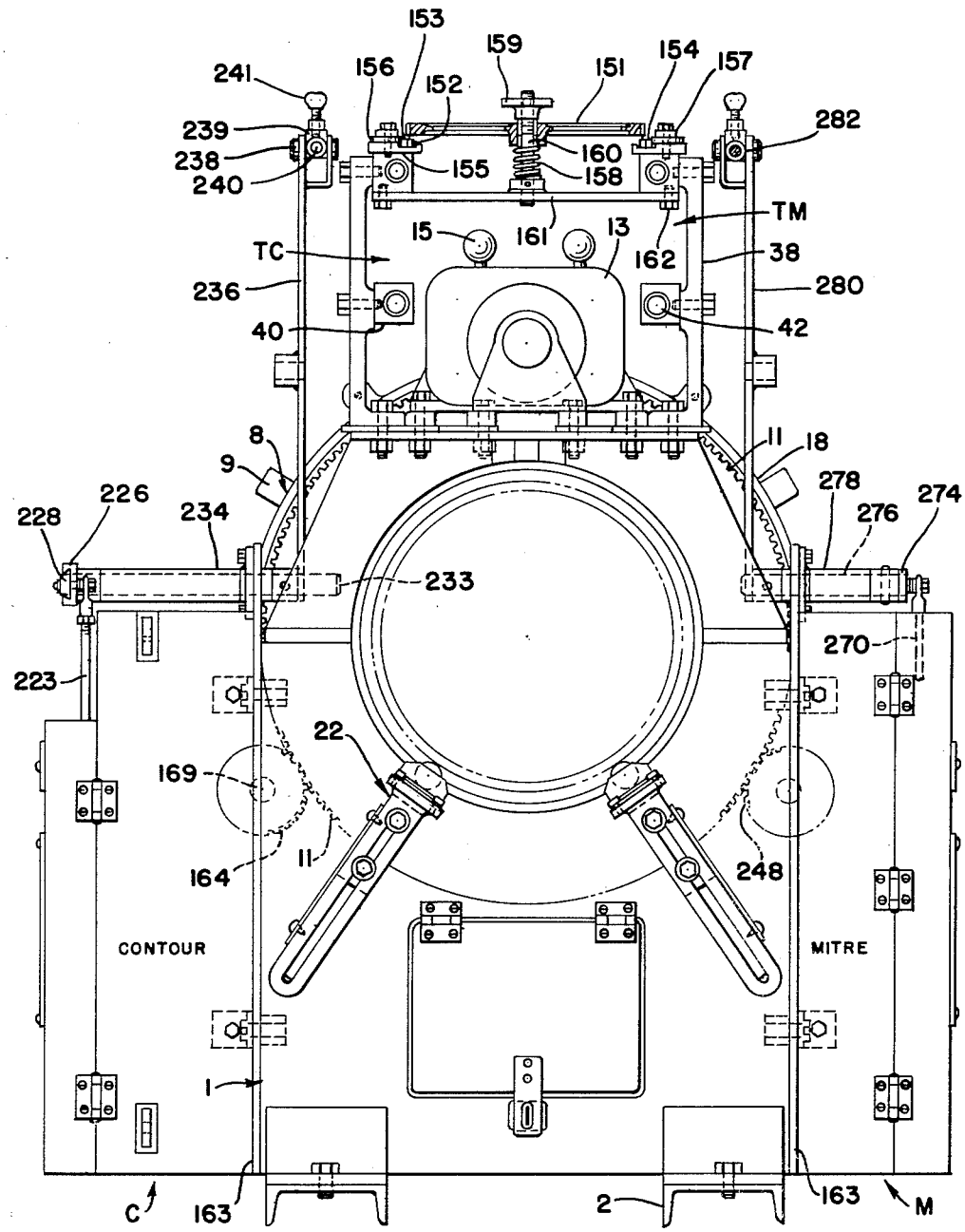
FIGURE 13 is a rear elevational view of the entire machine shown in FIGURE 11.

Referring now to the drawings in greater detail, and in particular FIGURES 11, 12 and 13, the front of the machine will be considered as viewed looking at the face of the chuck 8 (see FIGURE 12). The contour-motion module C will be located on the right-hand side and the mitre-motion module M will be located on the left-hand side. A torch-carrier assembly TC located to the right-hand side will transmit motion from the contour-motion module to the torch. The torch carrier assembly TM located to the left-hand side will transmit mitre motion to the torch.

The apparatus consists of a main body 1 mounted on two channel runners 2 which are secured to the floor for stability. A large ball-bearing 5 (see FIGURE 11A), having the inner race secured to the front of the main body 1 by means of screws 6 and the outer race secured to the chuck body by means of screws 7 rotatably supports the three jaw centering chuck 8. The three jaws 9 of this chuck are self centering by means understood by those skilled in the art, and is driven for rotation by means of gear teeth 11 cut in the outer periphery of gear support bearing 5. A small gear 12 mounted on output shaft of variable speed drive unit 13 engages the gear teeth 11 to provide rotation. The variable speed drive is adjustable from maximum r.p.m. to zero r.p.m. by means of lever 14. Lever 15 is used for reversing direction of rotation of drive 13.

The chuck is encompassed by a 360° scale which indicates the exact amount of rotation at pointer 17 attached to gear guard 18. Three roller supports 19 are mounted slidably on the face of the chuck opposite each jaw, and are secured in close proximity to the pipe by means of capscrews 20. Rollers 21 mounted on each support, engage the surface of the pipe when the chuck jaws are released, and permit easy feeding of the pipe lengthwise through the machine. Two more ball supports 22 are adjustably located at the rear of the main body to provide additional rolling support to the pipe for both rotation and feeding lengthwise.

The main body is open at both right-hand and left-hand sides when the contour and mitre-motion modules C and M are not used. When the packages are not used, a flat sheet 32 is used to close off the sides to provide an enclosed cabinet.

The gear guard 18 has two appendages 34 to encompass the driving gears for the contour and mitre-motion modules. It is thus arranged so that the apparatus can be used individually as a pipe rotator only to roll pipe over slowly at just the right speed for either manual or automatic welding. The other features of cutting can be added to this basic unit very easily in the field should it be decided to expand the usefulness of the machine at a later date.

The torch cutting equipment consists of torch carrier group TC and an identical group TM (see FIGURE 12) mounted on torch bar support brackets 38. Two torch bar support blocks 40 are fastened to each bracket 38, and the torch bars 42 are fastened together at their forward end by means of tie bars 44, which serve to extend or retract the bars in pairs. The bars have considerable length so the two torches may be spaced for simultaneous cutting on both ends of short sections of pipe. The two torches 45 and 46 may be angled toward each other as shown in FIGURE 12 to produce two opposed bevel cuts simultaneously. This system permits the cutting of a length of pipe with a bevel on each end without actually spacing the torches to the full length of the pipe required. It will be seen from the drawings that as tip 45 cuts the rear bevel on the pipe of length L, that tip 46 is beveling the front edge of the next piece. Hence, every revolution of the machine produces a complete length of pipe beveled on both ends.

The oxy-acetylene torch, which is best illustrated in FIGURES 14 and 15, comprises a main body 48 slidably supported by torch holder 49. Gear rack 50, secured to the torch body, engages pinion 51 attached to hand knob 52. Rotation of hand knob 52 moves torch body 48 through the holder 49. Tension is supplied by adjustment of screws 53 acting to open or close split holder 49. The cuting tips are mounted in a swivelhead 54 secured by hand wheel 55, and are thus adjustable so as to be disposed straight down or angled either way to produce any bevel angle required. The torch holder 49 is anchored in floating block 56 by means of shaft 57 and set screw 58, and the block 56 is bored to receive two vertical shafts 59. The shafts 59 are slidably supported in stationary blocks 61 by means of bushings 62. A thumbscrew 63 is used to limit the downward movement of the floating block 56 and to adjust the clearance between the top of the floating block 56 and the upper stationary block 61 designated as CL in FIGURE 14. An electrical solenoid 64 is mounted on torch adjusting bar 65 and is connected to the tops of the shafts 59 by means of link 66 and plate 67. The solenoid when energized, will move upward to elevate the torch in the amount of CL.

The object of this feature is to remove the piercing hole produced when piercing through the wall of a pipe with any cutting method. This piercing hole is larger in diameter than the normal width of metal removed in cutting, and leaves an ugly scar on an otherwise perfectly smooth surface. FIGURE 15 illustrates how this small vertical movement erases the piercing scar. A cutting torch, shown in full lines with angled tip, is positioned for pre-heat. A short period of time is required to build up sufficient heat in the pipe so the pipe can be pierced. When the torch control is set to ignite the pre-heat flame in the torch, the solenoid 64 is automatically energized and elevates the torch. When the cutting oxygen is turned on to pierce the hole, the solenoid is de-energized to permit the torch to drop down approximately ¼ inch. With the tip angled, this drop of the torch moves the angled cut back, as shown in dotted lines, FIGURE 15 to remove the piercing scar. This feature is particularly useful when piercing heavy wall pipe wherein the piercing hole becomes very large and rough.

The floating torch feature used for removing the piercing scar is also useful in cutting pipe which is "out-of-round." Commercial pipe today is quite accurate up to 12 inches in diameter. Pipe of larger sizes might be out-of-round by as much as ¼ inch to ½ inch. If the torch were held stationary while an eccentric pipe was rotated beneath it, the distance from the surface of the pipe to the torch tip would vary. With the torch tip angled as shown in FIGURE 15, it will be seen that this variation will produce an error in straightness of cut indicated by ER. To avoid this error, a floating ball support bracket 68 (see FIGURE 14) is provided, which can be quickly attached to the lower ends of shafts 59 and secured by means of set screws 69. The adjusting screw 63 is backed off so as to permit the block 56 to float freely with the irregular surface of the pipe. The transfer ball 70 contacts the pipe surface and is adapted to provide friction-free contact for both rotation and linear movement. Hand knob 52 is used to move the torch up or down to get proper clearance from the pipe surface to the torch tip. This distance will remain constant through use of the floating device and permit a true cut even when the pipe is considerably out-of-round.

In order to provide a fast operating machine, a centralized control box (see FIGURES 12, 16 and 17) has been designed for the purpose of enabling the operator to control gas flow to the torches, light the torches, and control the motor from a single location. This is accomplished by means of a complex system of controls hereafter referred to as the solenoid control box S. This box is a self-contained unit attached to the top of the front torch bar support blocks 40.

The control box consists of a base plate 75, body 76 and cover 77. Two control switches 79 and 80 are located so as to protrude from the front of the box S. Switch 79 is used to control the torch mounted on the torch bar group TM, which normally would be used to make mitre cuts or straight cuts. Switch 80 is used to control the torch mounted on torch bar group TC, which normally would be used to make contour cuts. Each switch also contains two push-button switches which are used to light the torches and to delay action of the motor when desired. The lighter switch 84 is used to light the torch on torch bar group TM. The lighter switch 85 is used to light the torch on torch bar group TC. The motor delay switches 86 and 87 are used to delay the rotation of the pipe when piercing heavy wall pipe in order to give the cutting oxygen time to pierce through the pipe before rotation begins. Normally, the pipe would begin to rotate immediately when the levers 82 or 83 are moved to the cut position. There are three solenoid control gas valves mounted on each side of the control box (see FIGURES 16 and 17). The three solenoid valves to the right-hand side 88, 89 and 90 are used to control the supply of cutting gasses to the torch on torch group TC. The three solenoid valves to the left-hand side 91, 92 and 93 are used to control the supply of gasses to the torch on torch group TM. The solenoid valves 88 and 91 control the flow of the acetylene to the torches. The solenoid valves 89 and 92 control the supply of pre-heat oxygen to the torches. The solenoid valves 90 and 93 control the supply of cutting oxygen to the torches. These solenoid valves are spring-loaded in a normally closed position. When power is supplied in proper sequence through means of switches 79 and 80, the valves are opened to permit flow of gasses to the torches. Each torch is equipped with three needle valves to adjust the rate of flow of each gas to obtain a proper mixture for good clean cutting action. These needle valves are adjusted by means of small hand knobs 94, 95 and 96 (FIGURE 15). Without the use of the centralized control box, these knobs would have to be turned on and off manually each time a torch was prepared for cutting. In addition, each would have to be precisely adjusted to get the proper mixture of gasses. The torch would then have to be lighted manually by a spark produced by a flint-rubbing apparatus held in the operator's hand. This type of operation is slow, and precise control is lost since manual adjustments are required for every cut made. Through use of the solenoid control box, the needle valves on the torches are set only once, and thereafter the solenoid valves turn the gasses on and off so the flame never gets out of adjustment between each cut. Once a good flame adjustment is obtained, it is duplicated time after time with no effort on the part of the operator. This feature is very important, for improper flame setting leaves an accumulation of slag on the cut surface, which requires considerable hand labor to remove. A properly set flame will produce a smooth cut with very little slag accumulation. The slag which does accumulate on a good cut is easily removed by a scraping operation rather than with an operation using hammer and chisel.

The gas input to the control box is received through three input lines 97, 98, and 98–A. This supply is split and carried to the opposite side by hoses 99, 100, and 101. Movement of the control handles to the first position clockwise (marked preheat) energizes the acetylene and pre-heat oxygen line solenoids to permit passage of these gasses to the cutting torch. The torch lighter button is then pushed in to permit passage of 110-volt power to the transformers 102 or 103 located on the underside of the solenoid box base plate. This voltage is stepped up to 10,000 volts within the transformer and sent to the torch via high-voltage line 104. This line is split at 105 by means of an electrical disconnect splice. An insulator block 106 secured to a clamping block 107, attached to the swivel head portion of the cutting torch by means of screws 108, is drilled to receive a short piece of 1/8 inch diameter tungsten electrode 109. This electrode is connected to the high-voltage line 104 by another disconnect splice 110 and is insulated from the torch by insulating block 106. Screws 111 secure the tungsten rod in properly spaced setting with the cutting tips so as to produce a spark when the 10,000 volt current is sent down the lighter wire. This spark ignites the mixture of the acetylene and oxygen being emitted under pressure from the torch cutting tip. The ignition of a torch requires only a fraction of a second to move the control lever and to push the ignition button. In fact, both switches can be operated simultaneously by a single hand to light up both torches in less than one second.

The gas supply enters the solenoid valves from the bottom; and when the solenoids are opened, the gas flows through the hoses 112 to a manifold block 113, and from there, through short hoses 114 to the torches. A wiring diagram shown in FIGURE 18 shows the electrical circuit for inter-connection of all operating components including the motor.

Movement of either control handle, 82 or 83, one position clockwise opens the acetylene and pre-heat oxygen. Pushing the lighter-button ignites the gasses at the torch tip by means of an electric spark. Approximately ten seconds of time is then required for the flame to heat the pipe to a red color before the pipe can be pierced. Movement of the control handle clockwise to the next position opens the cutting oxygen solenoid and closes the motor circuit to start the pipe rotation simultaneously. If the pipe has a heavy wall, the operator my elect to push the motor-delay button to hold back the rotation until the torch has had sufficient time to pierce the pipe. Upon completion of the piercing operation, the operator releases the motor-delay button to permit rotation to begin. In the event that either torch fails to cut, the control-levers can be moved back to the starting position and the reverse lever engaged to reverse rotation of the pipe to pick up the spot of torch failure. Movement of control levers counterclockwise will operate the motor only without energizing the solenoid valves so as not to permit passage of gasses.

The solenoid 64 shown in FIGURE 14 is also connected with this box for automatic operation. When either control lever is moved to pre-heat position, the solenoid is energized causing the solenoid to lift the torch. When the lever is moved to the cut position, the current to the solenoid 64 is cut off, and the torch drops down again to remove the piercing hole.

Figure 2:
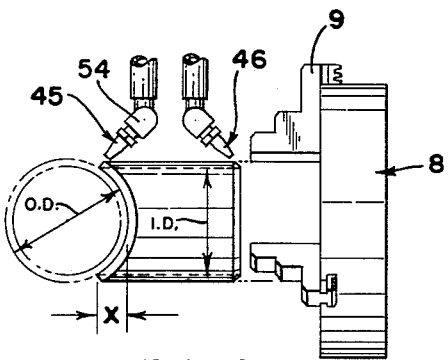
FIGURE 2 shows the position of two cutting torches for making a contour cut and a beveled cut-off simultaneously.
Figure 8:
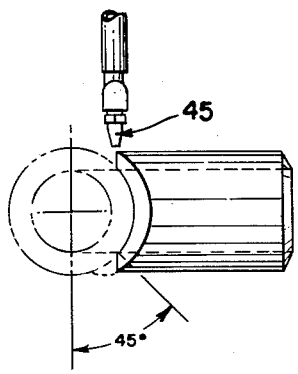
FIGURE 8 illustrates one position of the torch when using a variable bevel angle on the contour cut.
Figure 9:
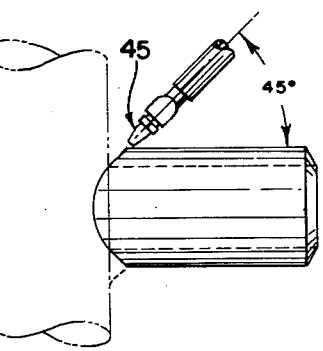
FIGURE 9 shows the position of the torch after the pipe in FIGURE "B" is turned 90° to illustrate the articulating motion of the torch during the cutting.
Figure 19:
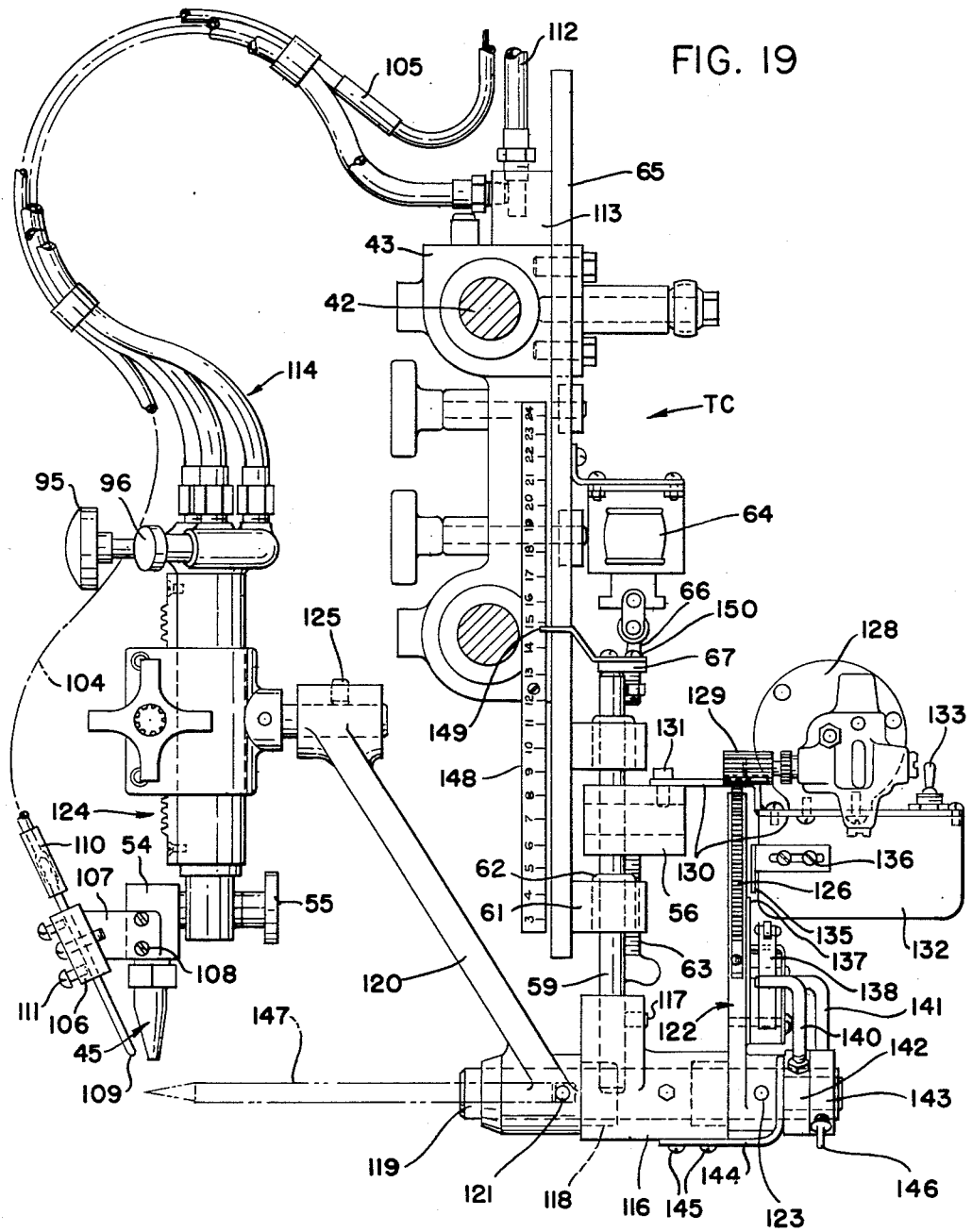
FIGURE 19 is a front elevational view of the variable beveling attachment.
Figure 20:
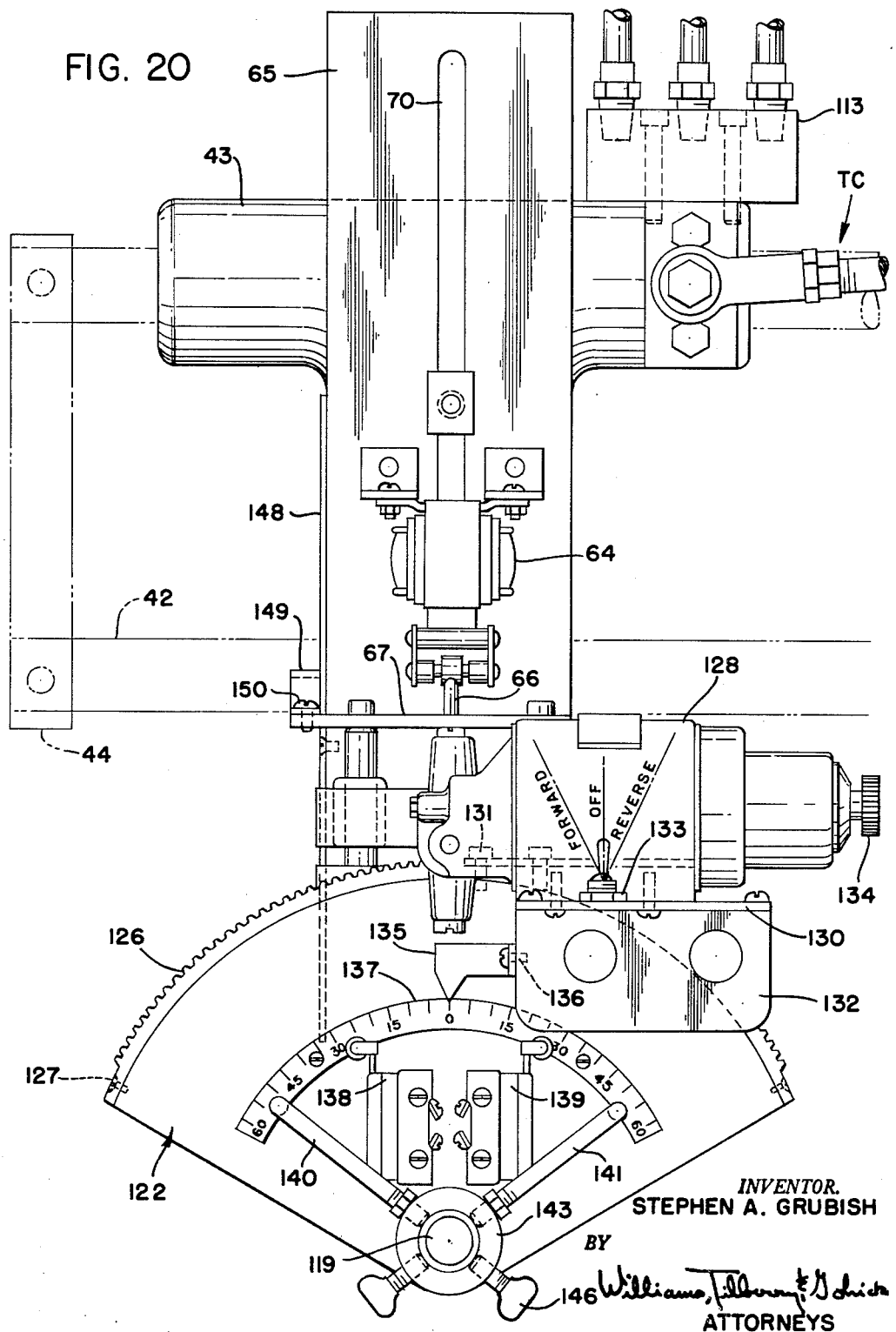
FIGURE 20 is a side elevational view of the variable beveling attachment shown in FIGURE 19.
Figure 21:
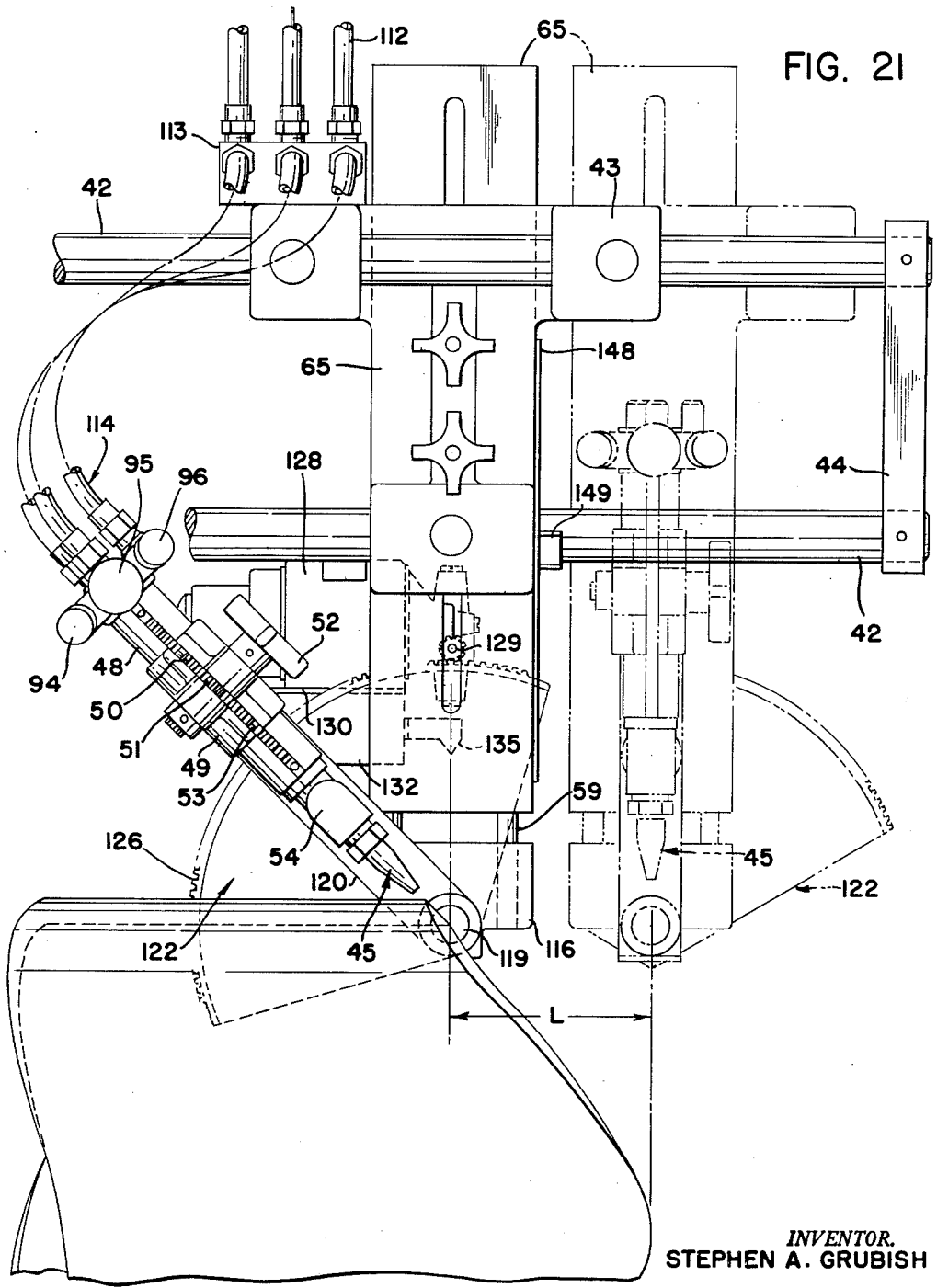
FIGURE 21 is a side elevational view of the variable beveling attachment similar to FIGURE 20, but illustrating the position of the cutting torch tilted down to produce a 45° bevel cut, and also, in phantom illustrating the vertical position for a straight throughcut.

The floating torch holder group shown in FIGURE 14 is used for cutting a fixed bevel-angle on a contour cut. Although the swivel heads on the torch are adjustable to change, the angularity of the cut, this must be done between cuts, and the heads remain at a given angle during operation. A contour cut in this manner would have a bevel angle constant with respect to the center of the pipe through the entire periphery as shown in FIGURE 2. A fixed bevel angle is satisfactory for standard wall pipe; however, it is not suitable for heavy wall pipe. A fixed bevel angle on heavy wall pipe would result in a V-groove which would be too large at the lips of an intersection, requiring too much welding time in the joining operation. As an illustration, if the torch tip was set at a 45° angle, when making a 90° saddle cut, as shown in FIGURE 9, and remained in a fixed position, the V-groove would be at least twice the cross sectional area at the lip due to the curvature of the joining pipe, as shown in dotted lines at the bottom of FIGURE 8. In order to keep this V-groove of fairly uniform cross-section for welding, the torch must be articulated during the cutting cycle. A device for accomplishing this torch articulation, while maintaining accurate linear movement, is shown in FIGURES 19, 20 and 21. The device is arranged as a separate attachment which can be quickly attached to replace the fixed-angle torch group shown in FIGURE 14. The torch carrier casting 43 is turned 180° so the floating block 56 and vertical shafts 59 are disposed to the outside of torch bars 42.

A pivot support block 116 is arranged to slip over the lower ends of shafts 59 and is secured by set screws 117. This block is equipped with needle bearings 118 to rotatably support pivot shaft 119. Rocker arm 120 is rigidly connected to this shaft by means of rollpin 121. The angle quadrant 122 is rigidly connected to the same shaft by means of rollpin 123 so it articulates in unison with rocker arm 120. A complete torch group 124, the same as shown in FIGURE 14, is mounted in the upper extremity of rocker arm 120 and secured by means of set screw 125. The angle quadrant 122 has a gear rack 126 fastened to its outer periphery by means of screws 127. A variable-speed motor 128 containing a driving pinion 129 is located to make driving contact with gear rack 126.

The motor is supported on plate 130 which is fastened to floating block 56 by means of screws 131. The wiring and electrical components to operate the variable-speed motor, such as resistor and condensor, are located inside of connector box 132, directly below the motor support plate. A toggle switch 133 is located adjacent the motor and is arranged to provide a forward, off, and reverse position as indicated in FIGURE 20. A dial knob 134 is located at the rear of the motor, and is used for adjusting the output speed of the motor. A pointer 135 is adjustably mounted on connector box 132 by means of screws 136. This pointer is shown at zero position of angle scale 137 when the torch is in a vertical position. Operation of the motor, either forward or reverse, produces the articulating motion required to produce a variable bevel angle as shown in FIGURES 8 and 9. Limit switches 138 and 139 are fastened to angle quadrant 122 and are arranged so as to contact stops 140 and 141 upon the limits of articulation required for the particular cut being made. The limit switches articulate with the angle quadrant 122 while the stops 140 and 141 are pre-set and remain stationary during operation. The stops are fastened to collars 142 and 143 which encompass stay bracket 144 attached to pivot support block 116 by means of screws 145. The stay bracket 144 encompasses the pivot shaft 119 and collars 142 and 143 encompass the sleeve portion of stay bracket 144. This arrangement provides a stationary anchor for the stops 140 and 141.

It will be seen that as the limit switches articulate to right or left, the stops can be set to limit motion in either direction any exact amount required from angle scale reading. The stop-collars 142 and 143 are secured by means of thumb screws 146 and are individually adjustable. The limit switches are connected to the toggle switch in such a manner that one switch will cut off the circuit for one direction only, permitting the toggle switch to be reversed to change direction.

The operation of the variable beveller motor although shown independent of the main solenoid control box S in the embodiment of FIGURES 19 and 20, may in the alternataive be synchronized to operate automatically upon the rotation of the work piece. In this event, motor 128 would be wired into and controlled by the main solenoid control box S, wherein both motor 128 and motor 13 would be wired in parallel for common actuation by motor control levers 82 or 83.

The speed of the variable beveller motor must be approximately timed so that it synchronizes the articulation of the torch with each quarter turn of the pipe while cutting. Articulation of the torch, however, has no effect upon the actual shape of the contour cut, which shape is controlled by linear movement of the torch carrier.

The center of the pivot shaft 119 must be in alignment with the inside diameter of the pipe being cut, in order for the variable beveller device to function accurately (see FIGURE 21). This is accomplished by means of a pointer 147 which is inserted into an aperture in the exact center of shaft 119. In the initial alignment of the apparatus, a short length of pipe of any size is chucked and the pointer 147 brought into exact alignment with the inside diameter by means of adjusting bar 65. The scale 148 is then secured to the front of carrier casting 43 with the reading corresponding with the inside diameter of the pipe being used, registering at the pointer 149 which is fastened to the tie bar 67 at the top of shafts 59 by means of screws 150. Care must be taken that adjusting screw 63 is not changed, or alignment will be lost. The torch must also be set with the swivel head in alignment with the torch body. The entire torch must then be aligned so that the cutting tip is directed exactly at the tip of pointer 147. Once this alignment is completed, the torch body may be racked up or down to compensate for different wall thickness of pipe; but it will always be directed at the center of the pivot shaft 119, and such movement will not affect the contour or angularity of the bevel even when the rocking is done during the cutting cycle.

Figure 10:
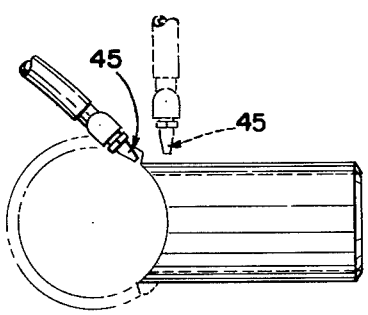
FIGURE 10 shows another variation of the variable beveling feature, showing the torch in position to make a reverse bevel required for making an inset saddle-joint as shown.

It will be shown in FIGURE 21 that, as the carrier 43 is moved lineally a distance L, due to impetus of the contour or mitre-motion packages, the torch can be articulated simultaneously without affecting the curve of intersection. The articulation shown in FIGURE 21 is from a 45° bevel angle to a straight through cut (as shown in dotted lines) to provide a cut with a varying bevel angle as illustrated in FIGURES 8 and 9. The articulation can also be arranged in the opposite direction to produce a cut as shown in FIGURE 10. A floating ball support 70 (FIGURE 14) can also be provided to permit the entire variable bevelling attachment to float on out-of-round pipe. Torch lifting solenoid 64 is strong enough to raise the entire bevelling attachment to remove the piercing hole. After the scale 148 is once aligned, the entire attachment can be preset for pipe size by setting pointer 149 at the proper scale reading to correspond with the inside diameter of the pipe to be cut. In normal practice, only one variable bevelling attachment would be used, usually mounted on torch bar group C, with the fixed bevel torch group mounted on torch bar M. This, of course, could be reversed; or two variable bevellers could be used simultaneously for special application. The torch carriers 43 are arranged so they may be mounted right-hand or left-hand or reversed on the torch bars, if desired.

Figure 3:
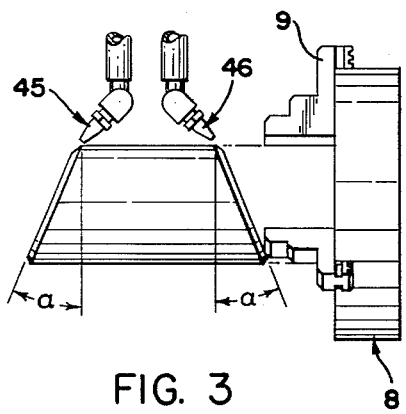
FIGURE 3 shows the position of two cutting torches for making two mitre cuts simultaneously.

The two torch carriers are arranged for independent operation. However, on occasion, it may be required to interconnect them to produce simultaneous opposed cuts, as shown in FIGURE 3. This is accomplished by means of a reversing gear 151 (FIGURES 13 and 22) which is disposed above, and in alignment with, the gear teeth 152 of gear racks 153 and 154. These racks are fastened to the torch carriers 43 at their forward ends, and slide through guides 155 at the point of meshing with gear 151. A ball-bearing 156 on each guide is adjustably secured to the guides by means of eccentric bushing 157 so the racks can be adjusted for proper meshing with the reversing gear 151. The gear is normally held above the racks (when not in use) by means of spring 158. In order to engage the gear, the hand knob 159 is turned to bring the gear down into contact with the racks. Once in engagement, it will be seen that one torch carrier must move in an opposite direction from the other. The motion impetus can be harnessed from either the contour-motion package or from the mitre-motion package. The gear 151 is rotatably and slidably mounted on stub shaft 160 supported by bracket 161 which is attached to the underside of the torch support blocks by means of cap-screws 162.

The foregoing description has discussed the pipe rotator and the addition of the torch-cutting-equipment. The next step in selective assembly is the addition of the motion-producing assemblies C and M. Two modules are available, one producing the motion required to cut the curvature when one cylindrical member intersects another. The other module produces the motion required to cut a cylindrical member intersecting an angled plane, normally referred to as a "mitre cut." Each of these units can be used alone and operated independently; or, they can be inter-connected with a cable and linkage arrangement to provide a compound movement, as will be described hereinafter.

A description of the contour motion module will be first undertaken.

The entire unit is mounted on a flat base-plate 163 (FIGURES 23 and 24), and is adapted so that it can be added to a machine already in the field. The side cover 32 is removed and the plate 163 is fastened to the main body 1. The gear guard has an appendage to receive the motion-drive gear 164 which is meshed with the chuck support bearing gear teeth 11.

The drive gear 164 (FIGURES 25 and 26) is rotatably supported by shaft 169 but is not pinned to the shaft until alignment between the chuck and the developing gear 170 is achieved. A bevel pinion gear 174 is secured to the shaft 169 by means of rollpin 175. This pinion engages the bevel gear teeth 176 on developing gear 170. The gear ratios in this gear train are such that the developing gear 170 makes one revolution as the three-jaw chuck 8 makes one revolution. The face of the developing gear has four tapped holes, accurately located, to fasten a dovetail bar 185 on the exact center line of the gear, and is secured thereon by four flat-headed capscrews 186. A dovetail slide 187 is arranged to slide on the bar 185 so that the ball bearing follower 188 can be offset from the center of rotation. The ball bearing is fastened to the slide 187 by means of screw 189. The slide is secured in any position by means of slotted set-screw 190.

The dovetail bar 185 contains a groove so scale 191 can be inset. This scale is located so the exact amount of offset from the center of the ball bearing to the center of the developing gear can be read at the back edge of slide as indicated by 192. This scale is fastened when the ball bearing is located at exact dead center, and shows zero runout on an indicator reading. The scale is then adjusted to read exactly zero and fastened to the dovetail bar 185. All readings on the scale thereafter show the exact amount of offset of ball bearing with respect to the center of rotation of the developing gear. The scale is proportional to the capacity of the machine. As an illustration, for a direct ratio the scale would be half size in order to set the diameter directly on the scale without dividing the pipe size by two and setting the offset on a full-size scale. When the output motion is multiplied, a corresponding change must be made in the scale readings, therefore, a different set of scales must be used for different capacity machines. Later illustrations on motion use a motion-multiplying factor of two to one; therefore, the scale shown in FIGURE 25 registers a reading of 24 inches, whereas the ball bearing is actually offset six inches from the center. A six-inch offset describes a twelve-inch diameter circle; and using a multiplying factor of two to one, the scale reading registers a 24-inch diameter.

The circle described by bearing 188 represents the inside diameter of the pipe being cut, in direct or multiplied ratios, and is the basic motion for the development of the curve of intersection of joining cylinders.

Figure 23:
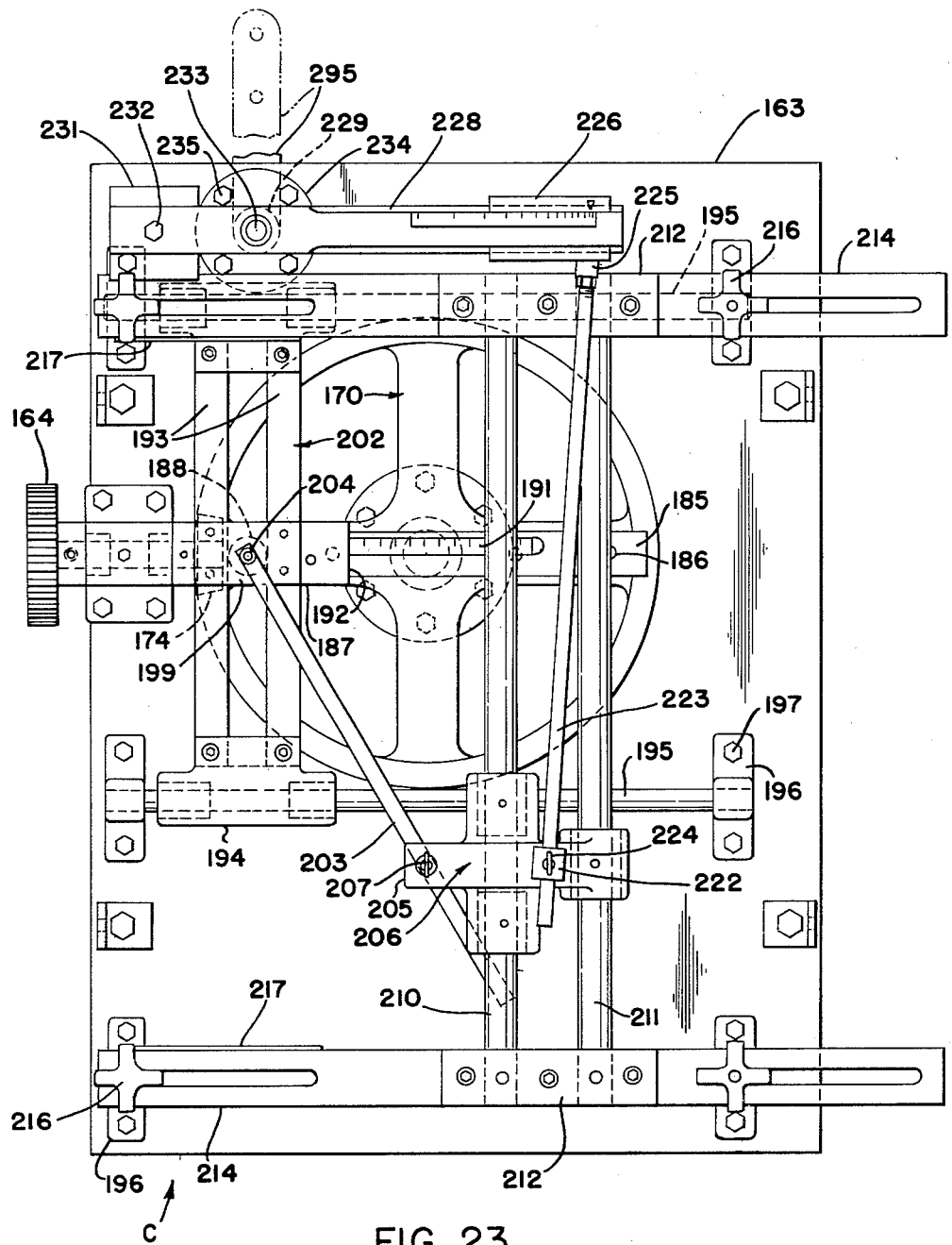
FIGURE 23 is a front elevational view of the contour-motion module.

The circular motion of the ball bearing 188 must be converted into a straight-line motion, and this is accomplished by means of a double slide arrangement shown in FIGURE 23. Parallel bars 193 straddle the ball bearing 188, and are fastened at their ends to slide castings 194 for sliding axial movement on shafts 195. The shafts are supported by four support brackets 196 fastened to base plate 163 by means of capscrews 197. An anchor bracket 199 is fastened to bars 193 by means of screws 200. This bracket is tapped at 201 to connect a developing bar which will be described later. It will be seen that, as the developing gear makes a half-turn, the slide assembly 202 moves two times the offset of the ball bearing from the center of rotation of the developing gear.

A developing bar 203 is fastened to the slide 202 by means of shoulder bolt 204 entering tapped hole 201 (FIGURES 23 and 24). This bar is square in shape and protrudes through a square hole in trunnion 205. This trunnion is rotatably supported in the O.D. slide 206 and is drilled and tapped from its stem end to receive a thumb screw 207 which is used to clamp against the developing bar 203.

Figure 4:
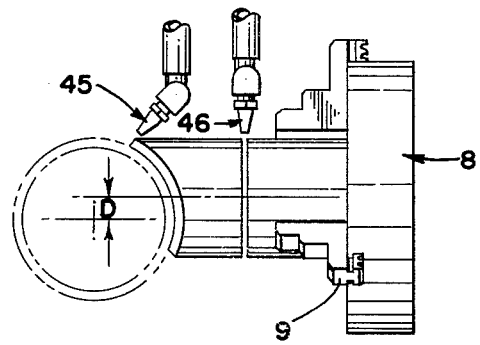
FIGURE 4 shows simultaneous cutting of an offset intersection cut and a straight cut-off.
Figure 5:
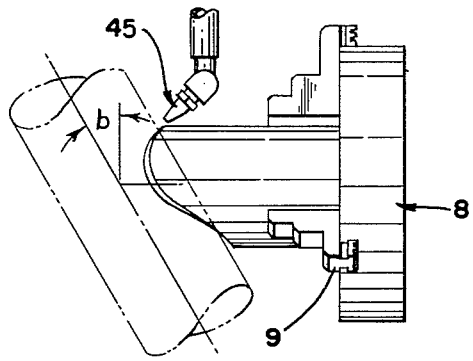
FIGURE 5 illustrates the cutting of an angular intersection known in the trade as a "lateral."
Figure 6:
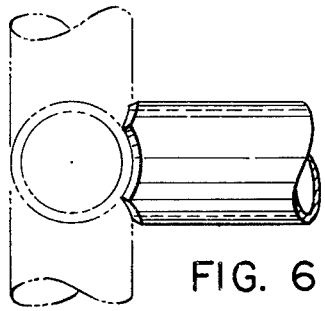
FIGURE 6 shows a double contour cut required when one pipe intersects two other pipes at right angles.

A scale 208 is inset in bar 203 and located to indicate the exact center distance from the shoulder bolt 204 to trunnion 205 and the reading is taken at point 209. This setting represents the outside diameter of the pipe joined by the pipe in the machine chuck as indicated by the dimension O.D. in FIGURE 2. The scale 208 is a half-size scale so the O.D. dimension may be set directly without dividing by two for direct ratio machines. The scale shown in FIGURE 24 is used on a machine with a motion-multiplying ratio of two to one and would therefore be a one-quarter size scale. Shafts 210 and 211 are supported in blocks 212 which are in turn secured to two slotted bars 214. In the initial alignment of the machine, the center line of the trunnion 205 must be accurately located in vertical alignment with the center line of rotation of developing gear 170. This is accomplished by shifting slotted bars 214 until exact alignment is obtained and then clamped in this position by means of hand knobs 216. A scale 217 is then attached to the side of each slotted bar 214 to register a zero reading at pointers 218. The pointers are attached first to support brackets 196 by means of screws 219 (FIGURE 40A). Thus, when the scales are properly attached, they will indicate accurately any offset between the trunnion 205 and the center of the developing gear 170. The support arrangement of slotted bars 214 permits measured offset of trunnion 205 to developing gear 170. This feature is used in making offset cuts as shown in FIGURE 4, and will be more fully described later.

Returning to FIGURE 23, it will be seen that, as the slide assembly 202 moves in a horizontal plane, the action of developing bar 203 produces a vertical movement in the O.D. slide 206. This movement is transposed directed (or multiplied) to the torch carrier; and, when synchronized with the rotation of the pipe being cut, produces an accurate curve of intersection.

The O.D. slide 206 is bored to receive push rod trunnion 222 (FIGURE 23). The push rod 223 passes through this trunnion and is clamped by means of thumb screw 224. The upper end of the push rod is screwed into rod end 225 and there locked by a nut. The rod end 225 is fastened to dovetail slide 226 by means of capscrew 227. The dovetail slide 226 is arranged to slide on dovetail bar 228 so that the distance from the center of rod end 225 to the fulcrum 229 of dovetail bar 228 can be changed. A trigonometric scale is attached to the dovetail bar 226 indicating zero at the position shown in FIGURE 23. Movement of slide 226 closer to the fulcrum 229 multiplies the motion supplied by push rod 223 before transmission to the torch carrier 43.

A counter-weight 231 is located to the opposite side of the fulcrum for balance purposes, and is fastened to the bar 228 by means of capscrew 232. A hub is welded to the back side of dovetail bar 228 and is bored to receive a shaft 233 and pinned so the shaft and bar move together. The shaft is supported rotatably by flanged bracket 234 which is fastened to the base plate 163 by means of capscrews 235. The shaft 233 protrudes beyond the base plate 163 toward the center of the machine, and serves as the medium for harnessing the motion produced by the contour-motion for delivery to the torch carrier 43 through a selection of levers for direct or multiplied ratios. The contour-motion package, as described, is the same for a number of sizes and capacities of machines. It remains to select the proper length of levers for further transmission of this motion to suit any capacity of machine desired. In the alternative, the rotational movement of shaft 233 can be harnessed by outside power means of air, oil, or electrical step motor devices, known in the industry as "servo-mechanisms." Servo-mechanisms are well known in the art, and are widely used, particularly in aircraft, wherein the movement of a lever or wheel by a pilot is precisely reproduced in direct or multiplied ratio at some distance removed from the pilot.

Figure 22:
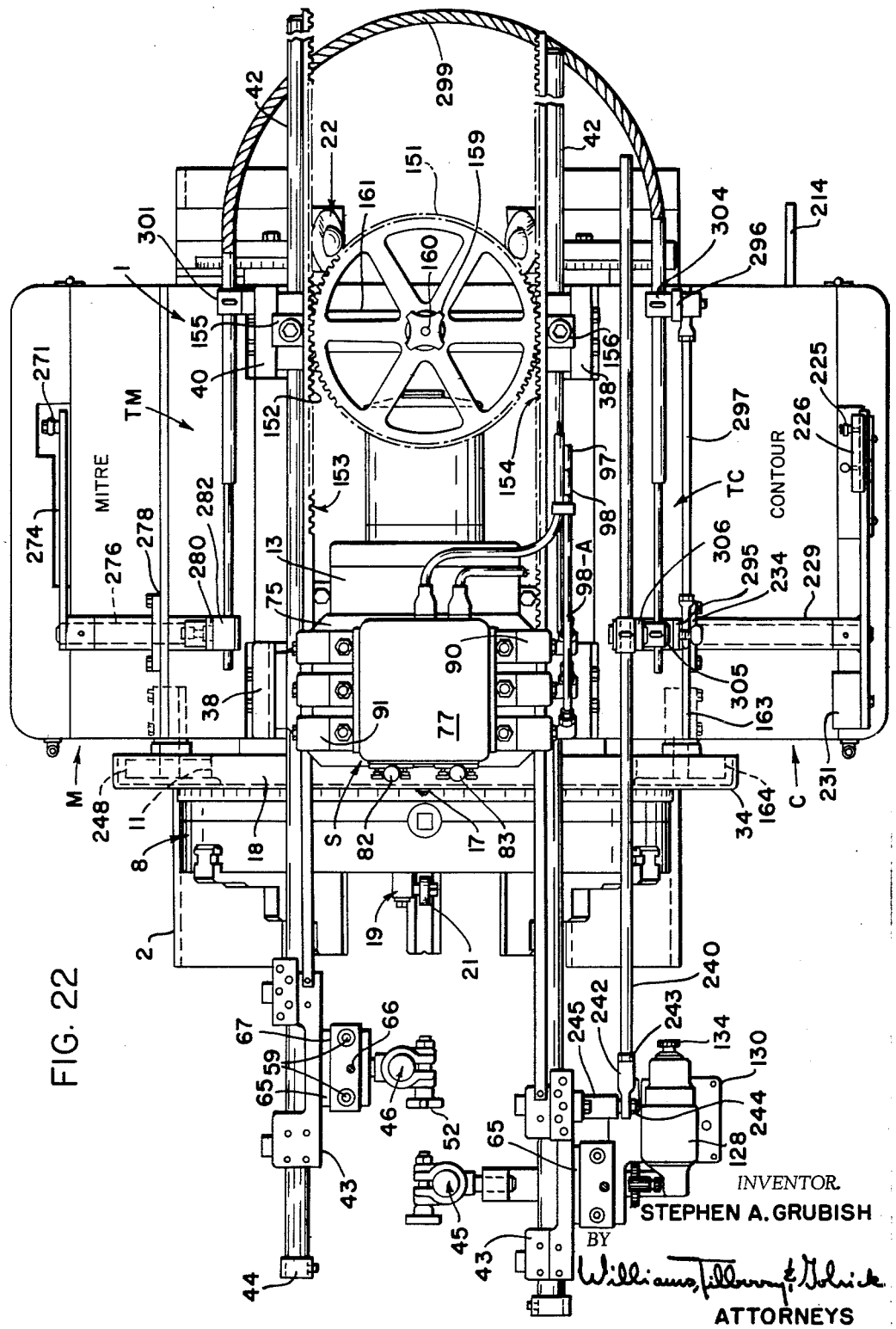
FIGURE 22 is a top plan view of the entire machine equipped with the linkage and cable assembly.

Referring to FIGURE 13, a single lever 236 is fastened to shaft 233 so as to move in unison with dovetail bar 228. A U-shaped clamp 239 straddles the trunnion pin 238 and carrier push rod 240 passes through both. A thumb screw 241 is used to apply clamping pressure against push rod 240 to hold it in any position. The forward end of the push rod 240 (FIGURE 22) is threaded to receive a rod end 242 which is locked by means of nut 243. The rod end is fastened to the torch carrier by means of capscrew 244 and spacer 245. Although FIGURE 22 shows the variable beveller attachment, it is understood the same capscrew and spacer is adaptable to clamp the rod end 242 to the fixed angle carrier group. The torch carrier can be adjusted to cut at any distance desired from the face of the chuck within the limitations of reach of the torch bars.

Figure 1:
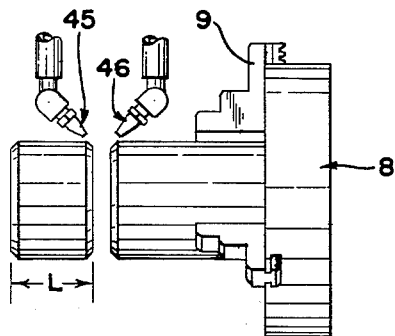
FIGURE 1 shows the position of two cutting torches for simultaneous beveling on two cuts in straight-cut-off operations.

In FIGURE 13, both the contour-motion package and the mitre-motion package are shown, it being understood that either could be used with the omission of the other. If only the contour-motion package were used, the machine could perform only the straight cut-off and contour cuts, as shown in FIGURES 1 and 2. If only the mitre-motion package were used, the machine could perform only the straight cut-off and mitre cuts, as shown in FIGURES 1 and 3.

The mitre-motion package M (FIGURES 27 and 28) is attached to the left-hand side of the machine, when viewed from the chuck end (FIGURE 12), and the base plate 163 is identical for both the contour and the mitre packages. The drive gear 248 meshes with gear teeth 11 on the outer race of chuck support bearing. The gear train from gear 248 to the developing gear 170 is identical with the contour side and is shown fully in FIGURE 25. The dovetail bar, slide, scale, and ball bearing are also basically identical, and aligned in the same manner. The gear 248 however, is pinned when the developing gear is positioned at 90° from the developing gear position on the contour side. This will be more fully explained in a later description of the operation.

Figure 27:
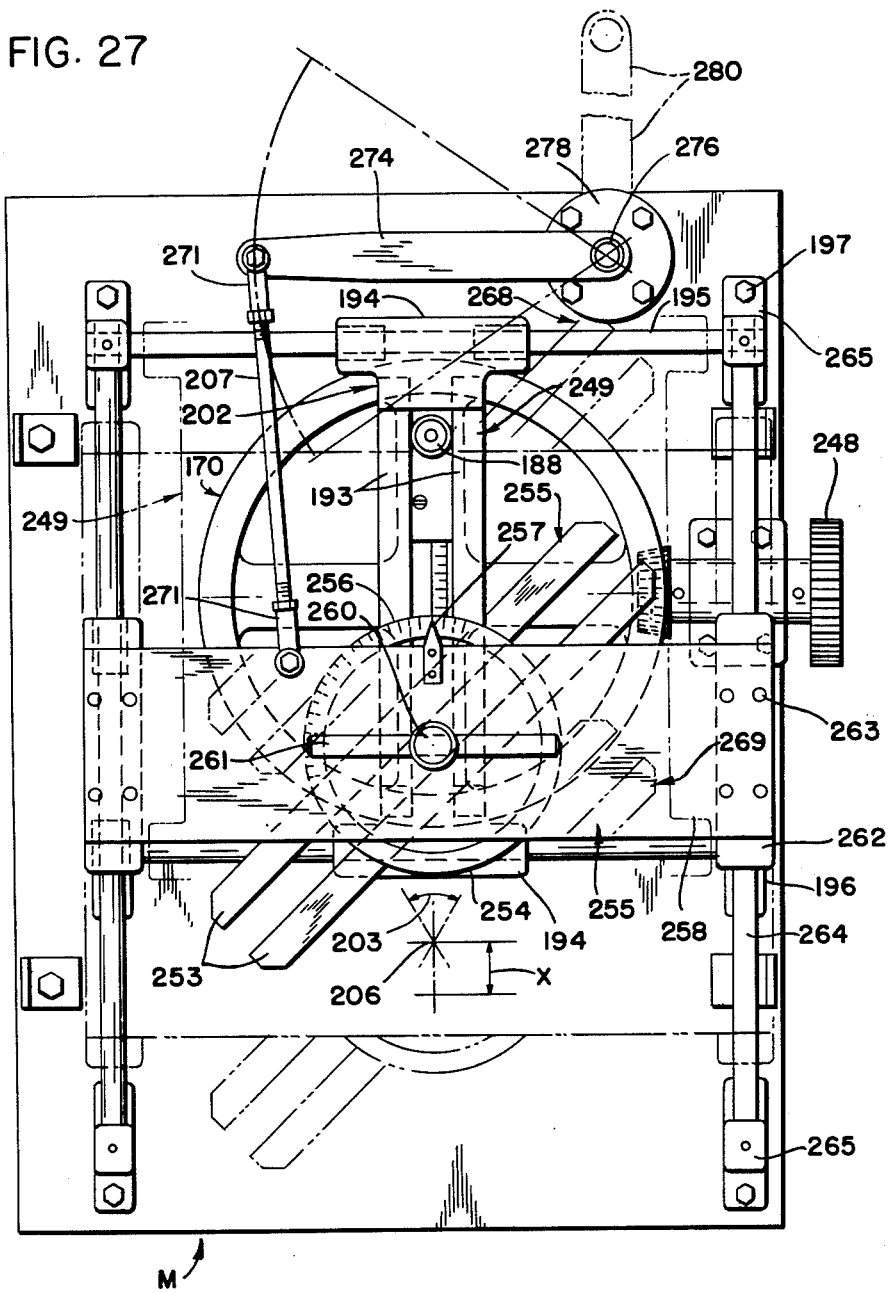
FIGURE 27 is a front elevational view of the mitre-motion module.

The cross slide assembly 249 in the mitre-motion package, FIGURE 27, is identical with the contour slide assembly 202, except the anchor bracket 250 is located near the lower portion of the slide, instead of at the center. Whereas the contour anchor bracket 199 was tapped to attach the developing bar 203, the anchor bracket 250 on the mitre side, supports a ball bearing 251 which is used to produce a vertical movement in a vertical slide arrangement. The rotation of the developing gear for a half turn (180°) moves the cross slide assembly 249 horizontally in the exact manner as illustrated in FIGURE 27. This ball bearing 251 is straddled by bars 253 fastened to the under side of the circular angle quadrant hub 254. The bars 253 form a slot which encompass ball bearing 251. It will be seen that, if the bars 253 are disposed horizontally, there will be no vertical movement of the angle quadrant slide group 255. If, however, the angle quadrant bars are inclined, the horizontal travel of ball bearing 251 will produce a vertical movement of slide group 235.

The angle quadrant hub 254 (FIGURE 27) has a recessed groove at its outer periphery to receive a protractor scale 256 which reads to 60° to either side of center. This protractor scale is accurately attached to register a zero marking at the pointer 257 when the bars 253 are on an exact horizontal plane. Once this alignment is accurately made, the degree of tilt of bars 253 can be accurately read from the protractor scale 256 as indicated by pointer 257.

The angle quadrant hub 254 is rotatably connected to the underside of cross plate 258 by means of threaded pin 259. This pin has a square head resting in a recessed groove so it cannot turn when clamping pressure is applied by clamping hub 260. A handle 261 protrudes through the hub 260 so the operator can apply leverage when clamping the angle quadrant in any position to insure no movement takes place under load during operation. The cross plate 258 is fastened to two bearing blocks 262 by means of screws 263. The shafts are supported by four support brackets 265 which also serve to hold the upper horizontal hardened shaft 195.

In FIGURE 27, the angle quadrant slide group 255 is shown in a central position in full lines with the bars 253 tilted at an angle of 45°. As ball bearing 251 moves to the left, in a horizontal line, the angle quadrant slide group must rise to the position shown in dotted lines at 268. As the ball bearing 251 is moved horizontally to the right extremity of its movement, the angle quadrant slide will move down to the position shown by dotted lines at 269. Thus it will be seen that the amount of vertical motion produced is dependent upon the amount of offset of the ball bearing on the developing gear 170, and the amount of tilt of the bars 253 as registered on the protractor scale. The vertical motion, when transmitted in a direct, or multiplied, ratio to the torch carriers in synchronization with the pipe rotation, will produce an accurate mitre cut as shown in FIGURE 3.

The means for transmission of the vertical motion to the torch bars consists of a tie rod 270 (FIGURE 27) having a rod end 271 at each end. The lower end of the tie rod is anchored to the cross plate 258, and the upper end of the tie rod is fastened to the mitre lever 274. The hub portion of lever 274 is fastened to shaft 276. Shaft 276, supported by the flanged bracket 278, which is fastened to base plate 163 extends through the plate 163 toward the center of the machine and is used to harness the mitre-motion for direct or multiplied ratio to the torch carrier 43.

Referring again to FIGURE 13, a vertically disposed lever 280 is fastened to the shaft 276. The distance from the trunnion 282 at the top of lever 280 to the shaft 276 is twice as great as the distance from the upper rod end 271 to fulcrum point of lever 274, so a multiplication ratio of two to one is illustrated. The torch push rod arrangement fastens to the left-hand torch bar group M when the mitre-motion module is used independently of the contour-motion module.

Both the contour-motion and the mitre-motion modules can be used on a machine as shown in FIGURE 13, and can be used individually or simultaneously in the arrangement shown.

Figure 30:
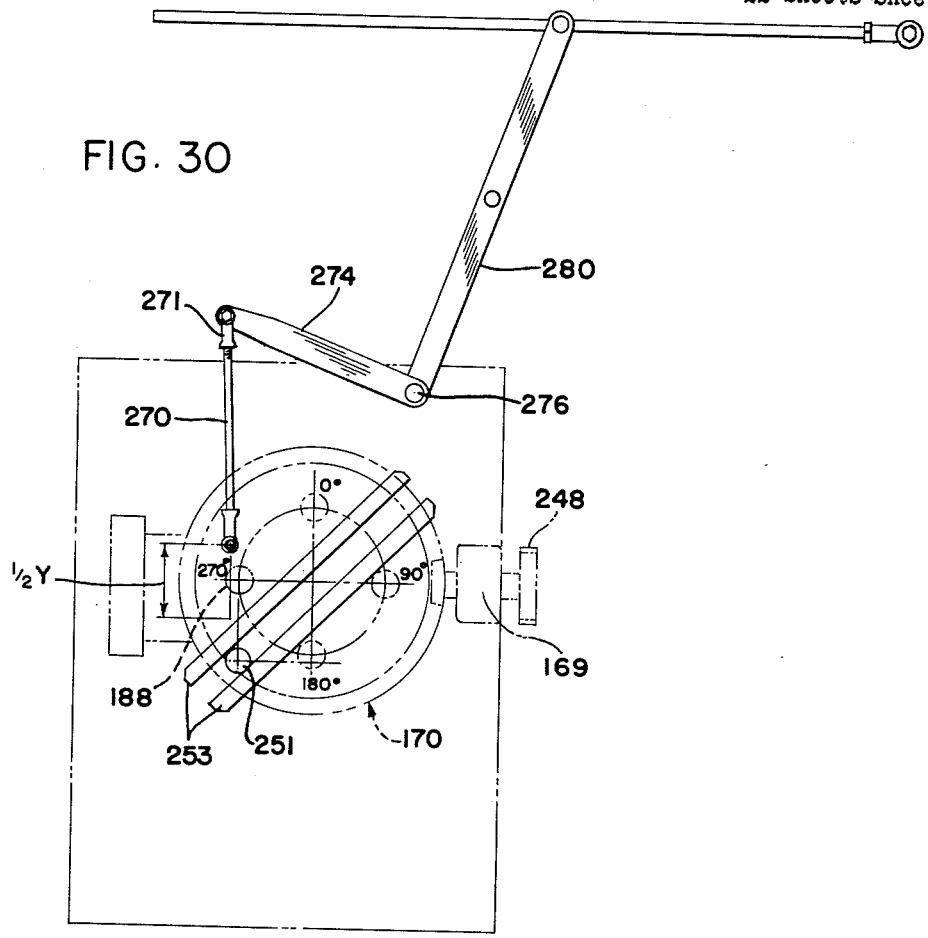
FIGURE 30 is a schematic diagram of the mitre module.
Figure 47:
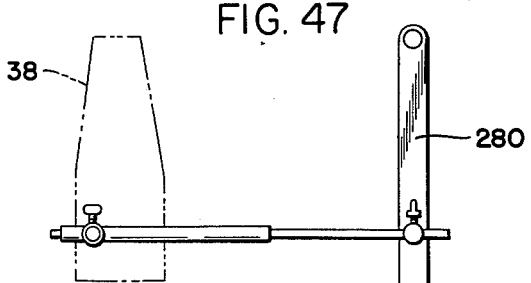
FIGURE 47 is a schematic representation of the mitre-motion module advanced 90° from FIGURE 44.
Figure 49:
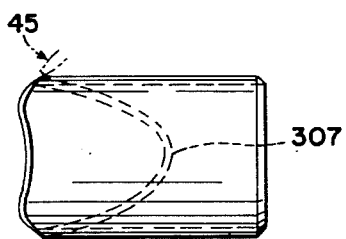
FIGURE 49 is a schematic representation of a lateral joint turned 90° from FIGURE 42.
Figure 48:
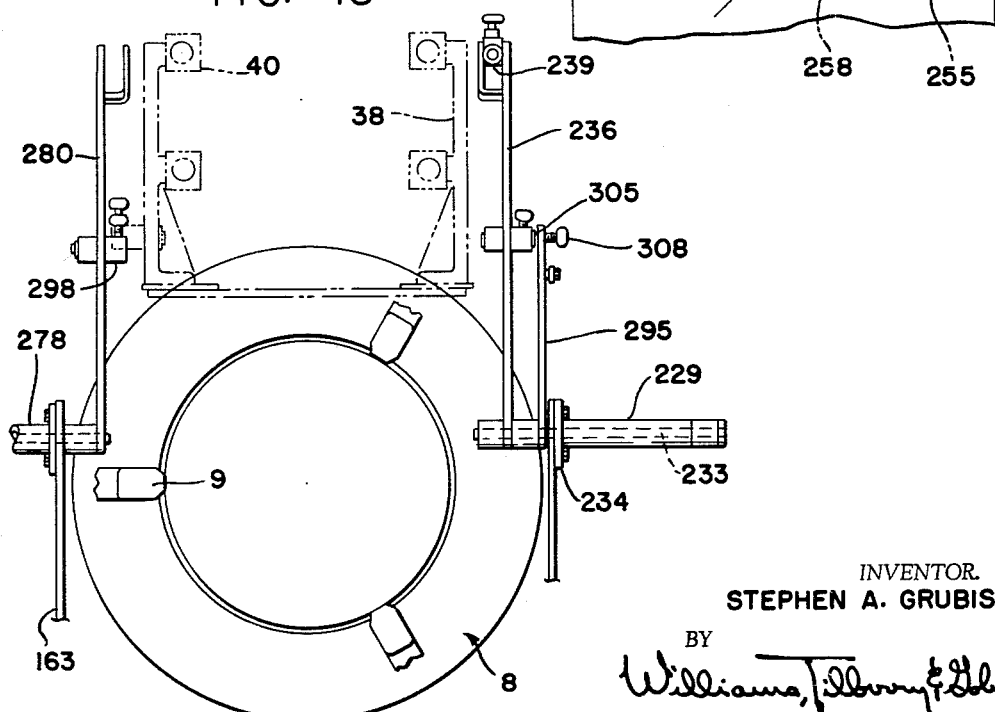
FIGURE 48 is a front elevational view of the pipe chuck as it relates to FIGURES 46 and 47.

The proper synchronization of these units is shown in FIGURES 29, 30, and 31. With the jaw accurately located at top dead center (FIGURE 31), the developing gear 170 on the contour mechanism must be located with the ball bearing 188 at the vertical dead center position (FIGURE 29). The motion drive gear 164 is, at this point, drilled in assembly with the shaft 169 and staked with a rollpin 293. Once secured in this position, the developing gear 170 is always in synchronization with the chuck, and the position of ball bearing 188 is always in angular alignment with the mark on the chuck jaw.

With the chuck in position (FIGURE 31), the developing gear 170 on the mitre-motion module is positioned so that the ball bearing 188 is offset horizontally to the left, toward the back of machine, as shown in FIGURE 30. The motion drive gear 248 secured to shaft 169 is in synchronization with the chuck 8, and the ball bearing 188 is in angular alignment with the chuck, but positioned to lag 90° behind the marked jaw during rotation.

The purpose for the 90° lag in the mitre mechanism will become apparent from FIGURES 32 and 33. With the chuck jaw at the top dead center (FIGURE 31) and the contour mechanism positioned as shown in FIGURE 29, the contour cutting tip is at the position shown in FIGURE 32. Simultaneously, the mitre cutting tip is at the position shown in FIGURE 33.

Measurements for length can be taken from the position marked zero degrees in FIGURE 32; however, the lips at position 90° and 270° are indeterminate and could not be taken directly off the center line pipe drawings. The mitre cut in FIGURE 33 could be measured at any one of the four quarter points on the periphery to establish proper length for the cut-off. The position of the mitre-motion mechanism in FIGURE 30 moves the cutting tip to its farthermost point from the chuck when using a single-lever independent operation. When combining this motion to the contour-motion, the motion will be reversed; and the tip would be positioned at the 180° position, or closest to the chuck.

In order to follow through a cutting cycle in detail, reference is made to FIGURES 34 through 38, wherein rotation is indicated by directional arrows. With the contour developing gear positioned as shown in FIGURE 34, the torch tip is positioned as shown in FIGURE 37. With the mitre mechanism positioned as shown in FIGURE 35, the mitre-cutting tip is positioned as shown in FIGURE 38. When the chuck is rotated 90° to top dead center position (FIGURE 31), the ball bearing 188 has also advanced 90°, as shown in FIGURE 29, and a vertical movement of distance X has been made to develop the curve of intersection for a contour cut. The distance X is transmitted to the torch carriers in direct ratio, FIGURE 34, or multiplied 1½ times, or 2 times, to provide motion for larger-capacity machines.

Similarly, as the chuck is rotated 90°, the mitre mechanism moves from the position shown in FIGURE 35 to the position shown in FIGURE 30 to produce a vertical movement of distance ½Y. A quarter turn produces only half of the full movement on the mitre side; whereas, a quarter turn produces the full movement on the contour side. The motion ½Y is transmitted similarly to the torch carrier in direct ratio, or multiplied by the ratios of 1½ or 2, for larger capacity machines, as shown in FIGURE 35.

The scale settings required are taken dimensionally from the pipe sizes. The ball bearing 188 on both contour and mitre sides are offset for the inside diameter of the pipe being cut, represented by radius A in FIGURES 34 and 35, 37 and 38. For a T-joint (FIGURE 37) the outside radius of the pipe being joined, as indicated by radius B, is set on the developing bar (FIGURE 34). A mitre cut does not have a setting of radius B, since it is an intersection with a plane rather than with a cylinder; therefore, an angle setting C is required (FIGURE 33). It will be noted that the angle setting C (FIGURE 33) is taken from reference line R—R at right angles to the centerline of the pipe being cut. The limitations for the development of a mitre angle is considered 60° from line R—R. Steeper mitre angles can be cut; however, the angle cannot be set directly on the protractor scale 256, but rather must be set from the data obtained by a simple calculation. A fourth dimensional setting D is frequently used in pipe cutting work (FIGURE 39). It represents the distance between the center lines of joining pipes, when the centerlines are offset. Any offset of the trunnion 205 from the center of gear 170 will produce an offset cut as shown in FIGURE 39. The amount of offset D is read directly on scales 217 with respect to pointers 218 (FIGURE 40). The upper and lower slotted bars 214 along with the vertical shafts 210 and 211 are moved in unison to the left the exact offset required, and clamped in this offset position by means of four hand knobs 216. The action of the developing bar set at radius B and offset D will generate the movement required to make the offset cut shown in FIGURE 39. The angularity of the developing bar will be quite different when the cross slide 202 is at the horizontal extremes, as shown in FIGURE 40, therefore, the lips (long points of the intersection) will not be in the same plane as an on-center cut. FIGURE 41 shows a top view of FIGURE 39. This offset feature can be used on angular intersection as well as perpendicular intersections.

Angular intersections of cylindrical members requires that contour and mitre motions be added together. In order to do this, a more complex kinematic system than discussed heretofore, must be resorted to.

Figure 7:
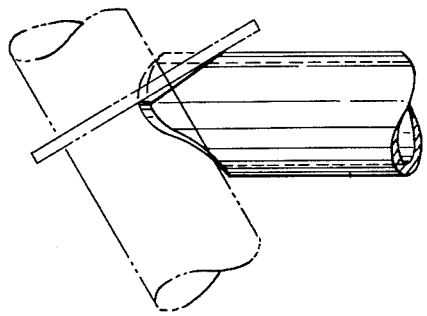
FIGURE 7 shows another double cut wherein a pipe is contoured to fit another pipe and also a flat plate.

Referring now to FIGURES 11, 22, and 42 through 49, the apparatus disclosed therein is capable of making any cut illustrated in FIGURES 1 through 7. Thus, it has the capability to make contour or mitre cuts separately and simultaneously, and in combined compound motion to provide overlay mitre cuts on top of contour cuts, as shown in FIGURE 7. In fact, the machine, as equipped in FIGURES 11 and 22, is capable of making any type of cut which might result from the intersection of any number of cylinders or planes.

FIGURE 42 shows a so-called lateral cut, with the position of the cutting tip shown in dotted lines. FIGURE 43 shows the position of the contour mechanism at this particular point of development; and FIGURE 44 shows the mitre mechanism at this particular point of development. FIGURE 45 shows the position of the chuck at this point.

The machine setting A for the diameter of the pipe being cut, B for the outside diameter of the joining pipe, and C for the angle of intersection are made in the same manner as set forth hereinabove. It will be noted that the mitre-motion module will deliver the motion 2Y, while the contour package will deliver the motion 2X (FIGURE 42). However, the addition (or subtraction) of the distances 2Y and 2X will not produce the right curvature, and there will be an error in the amount of 2Z. This is due to the fact that the contour mechanism delivers the correct motion in the plane P—P, but the torch travels in plane Q—Q. A correction must therefore be made in the contour motion to produce the proper curvature. The correction consists in finding the hypotenuse of the right triangle formed by planes P—P and Q—Q, and represented by 2H in FIGURE 42. The contour distance 2X must be converted into the distance 2H in an infinite number of increments during operation. This is accomplished by means of the dovetail slide and trigonometric scale shown in FIGURE 43. The scale is arranged to multiply the distance 2X by a factor (depending on angle C) so as to convert it to 2H. By moving the dovetail slide 226 closer to the fulcrum point 229, the output motion is increased in a preselected proportion, according to angle C. The scale determines the proper proportion, since it was created from trigonometric tables. One side of the right triangle is known 2X and also the angle C; therefore, the hypotenuse is easily found by multiplying 2X by the secant of angle C. The position shown in FIGURE 43 shows the stamp line on the slide registering at 45° on the scale. This position would multiply the motion X by a factor of 1.414 which is the secant of 45°. If the slide were moved closer to the fulcrum to register at 60°, the factor would become 2.000 which is the secant of 60°. Thus, the correction factor for any angle C is automatically taken care of when the slide 226 is set for the proper angle. The motion 2Y and 2H in FIGURE 42 is not a matter of pure addition, for sometimes the motions may be opposed and a net difference is transmitted to the torch bars.

In FIGURE 43, the lever which is pinned to shaft 233 is a short lever 295 which is tied to a similar floating lever 296 by tie rod 297 for movement in unison. The mitre lever 280 is the same lever as shown in FIGURE 13, however, the torch push-rod, clamp, and trunnion are removed from the top and a trunnion 298 is located midway down the lever. This trunnion has an aperture to receive the sliding rod portion of push-pull cable-assembly 299. A thumb screw 300 is used to secure this rod in the trunnion. A stationary trunnion 301 is supported in a sleeve 302 supported by the rear left-hand torch bar bracket (viewed from front of the apparatus). This trunnion has an aperture to receive the stationary sleeve portion of the push-pull cable 299. A thumb screw 303 is used to clamp this sleeve.

The operation of a push-pull cable is well known and consists of a slidable inner wire, or flexible cable, encased in a flexible outer tube. The outer tube is normally clamped at both ends so that, when the motion is applied to the inner cable at either end, it is transmitted equally to the other end. Thus it is evident that, as the mitre lever 280 moves backward a distance ½Y (FIGURE 44) at the trunnion, an equal motion will be transmitted at the other end of the cable. The cable, however, is curved in a full 180° bend (FIGURE 22), so the motion is actually reversed. In order to add the motion transmitted by the mitre lever to the contour lever, it is necessary to anchor the other end of the cable housing to the moving contour lever. This is accomplished by anchoring the cable sleeve in trunnion 304 located at the top of the floating lever 296. Since lever 296 moves in unison with contour lever 295, the effect obtained would be as if it were attached directly to lever 295. The combined motion is transmitted to trunnion 305 located midway on lever 306. All motions transmitted in this system are direct motions received from the motion mechanism. This motion is multiplied by two in the final lever 306 (FIGURE 43). The motion at the top of lever 306 is transmitted to the torch carrier by the same push-rod arrangement described previously. It must be noted that the mitre lever 280 has no direct connection with the torch carriers in this arrangement, but merely acts to transmit motion through the push-pull cable assembly. In FIGURE 43, it will be noted that the contour lever 295 has moved backward a distance ½H, while the mitre-motion has moved lever 306 forward a distance ½Y. The net result of these two motions is a forward movement of Y—H at the top of lever 306 after a 2 to 1 multiplication.

It should be noted that the oscillation of floating lever 296 in no way affects the transmission of the mitre motion. The oscillation of this lever merely changes the shape of the 180° bend in the cable, very slightly. A one-inch movement of the inner cable on the mitre side will result in a one-inch differential between the positions of lever 295 and 306 at its midpoint.

FIGURES 46, 47, 48 and 49 show the same development shown in FIGURES 42, 43, 44 and 45, except that the rotation is advanced 90° and the torch is now at the 90° point of the periphery. The contour mechanism now has moved levers 295 and 296 forward to a vertical position. Since the mitre lever 280 is located midway in its travel, the only effective motion present is contour motion 2H. It will be noted that in this particular cycle, the mitre lever and contour lever move in the same directions, however, the push-pull cable reverses the mitre motion, so that the distances are actually subtracting from each other at times. The synchronization of the contour-developing gear and the mitre-developing gear are such as to produce the low point of intersection 207 when the marked jaw is at top dead center. When the cable is removed, a thumb screw 308 located at the top of contour lever 295 may be screwed through the lever until its end enters the aperture in the end of trunnion 305. This causes levers 295 and 306 to be locked together and to operate as a single lever. The push rod then transmits only contour motion to the torch carrier C. Similarly, a second pushrod group can be inserted in the trunnion at the top of the mitre lever 280 and transmit motion only to the torch carrier M. The operation would then revert to the single-lever operation shown in FIGURE 13.

Either contour or mitre motion only can also be transmitted by means of the cable linkage. When mitre motion only is to be used, the offset of ball bearing 188 is set at zero, so that as developing gear 170 revolves, no contour motion is developed. Levers 295 and 296 remain stationary, and the cable transmits only mitre motion to lever 306. If contour motion only is to be transmitted, the mitre-developing gear is set for zero offset, so that no mitre-motion is developed. Mitre lever 280 is then stationary, and no movement of the inner cable is made. The cable between lever 296 and 306 will then serve as a solid link and lever 306 will move in unison with lever 295.

The disclosure made has taken into account all problems encountered in the cutting and joining of cylindrical members; and means have been provided to give the operator a simple and accurate method for the solution of all these problems. From the foregoing, it will be seen that my invention provides a pipe cutting device which is suitable for fully automatic operation in a novel and improved manner. It is to be understood that the embodiment of the invention shown herein is by way of example only, and is not intended to be construed in a limiting sense.

For instance, the transfer of basic motions from the motion-generating packages to the torch carriers may be accomplished in a number of ways and we do not wish to be limited to the lever and cable method disclosed. A multiplication ratio of 2 to 1 is the practical limitation for a direct type of motion transfer. However, servo-mechanism system in air, oil, or electrical step motors can be substituted to transfer and multiply basic motions by outside power means. A powered servo-mechanism can make possible a multiplication ratio of 6 to 1, or even more, to operate very large pipe machines from the same motion-generating modules.

It is believed that the foregoing discussion and illustrations enable those skilled in the art to practice the invention; that other arrangements and modifications will occur to those guided by the teachings of this invention; and that these other arrangements may be resorted to without departing from the scope of this invention.

Having thus described my invention, I claim:

1. A pipe cutting apparatus comprising: a frame; a pipe chucking and rotating means supported on said frame; a contour module mounted on said frame, said contour module including a contour rotary driven element, a first output element, and a contour motion transmitting means for converting the rotational movement of said driven element into a first linear movement of said output element, said first linear movement having at least two directional reversals during a complete cycle of said contour driven element; a mitre module including a mitre rotary driven element, a second output element, and a mitre motion transmitting means for converging the rotational movement of said driven element into a second linear movement of said second output element, said second linear movement having only one direction reversal during a complete cycle of said driven element; and means for selectively connecting each of said output elements onto a cutting torch reciprocally mounted on said frame for cutting a workpiece mounted within said chucking and rotating means.

2. An apparatus as defined in claim 1 including means for coupling said first and second output elements whereby the linear motion imparted to said cutting torch is the summation of the separate motions imparted by said output elements.

3. An apparatus as defined in claim 1 including means for interconnecting said contour driven element and said mitre driven element.

4. An apparatus as defined in claim 1, including first servo-means responsive to the movement of said first output element; second servo-means responsive to the movement of said second output element; third servo-means responsive to the combined responses of said first and second servo-means; and means to axially shift said cutting torch responsive to signal from said third servo-means.

5. An apparatus as defined in claim 1, wherein said contour motion transmitting means includes a first output lever mounted on said frame and pivotally shiftable by said contour driven element; said mitre motion transmitting means includes a second output lever mounted on said frame and pivotally shiftable by said mitre driven element; a pivotally shiftable torch final drive lever mounted on said frame; a flexible sheath and cable; said sheath being immovably secured at one end to said frame adjacent one of said modules, said cable being secured at said one end to the output lever of said one module; the other end of said sheath being secured to the other output lever shiftable by said other module; said cable being secured at the other end to said torch final drive lever; and means to connect said final drive lever to axially shift said cutting torch, whereby the motion imparted to said torch is the summation of the separate motions imparted by said modules to said output levers.

6. An apparatus as defined in claim 1, including torch final drive means interposed between said contour module output element and said reciprocally movable cutting torch; coupling means between said mitre module output element and said final drive means; means to impart motion to said coupling means by said contour module output element; and means to impart motion to said final drive means by said coupling means.

7. An apparatus as defined in claim 6, wherein said coupling means comprises a flexible sheath and cable, said sheath being immovably secured at one end to said frame adjacent said mitre module and being secured at the opposite end to said contour module output element for movement therewith; and said cable being secured at said one end to said mitre module output element and at the opposite end to said final drive means.

8. An apparatus as defined in claim 6, including a torch final drive lever mounted on said frame between said contour motion first output lever and said cutting torch; a flexible sheath and cable; said sheath being immovably secured at one end to said frame adjacent said mitre module and at the opposite end to said contour motion first output lever; and said cable being secured at one end to said mitre-motion second output lever and at the opposite end to said final drive lever.

9. An apparatus as defined in claim 1, wherein said contour motion transmitting means includes a first output lever mounted on said frame and pivotally shiftable by said contour driven element; means to connect said first output lever to axially shift said cutting torch; said mitre motion transmitting means includes a second output lever mounted on said frame and pivotally shiftable by said mitre driven element; and means to connect said mitre second output lever to axially shift said cutting torch.

10. An apparatus as defined in claim 1, including a first and second cutting torch, support means for reciprocally supporting said first cutting torch; support means for reciprocally supporting said second cutting torch for movement in line with said first cutting torch; means to connect said contour module output element to one of said cutting torches; and means to connect said mitre module output element to the other of said cutting torches.

11. An apparatus as defined in claim 1, including a first and second cutting torch, support means for reciprocally supporting said first cutting torch; support means for reciprocally supporting said second cutting torch for movement in line with said first cutting torch; means to connect one of said module output elements to shift one of said cutting torches; and means to shift the other cutting torch equally but in the opposite direction responsive to the movement of said first-mentioned cutting torch.

12. An apparatus as defined in claim 1, including means to continuously vary the angle of attack of said cutting torch as a function of the angle of rotation of a workpiece in said pipe chucking and rotating means.

13. An apparatus as defined in claim 1, including means to continuously vary the angle of attack of said cutting torch as a function of the angle of rotation of a workpiece in said pipe chucking and rotating means, a support for said cutting torch, said angle varying means comprising a torch bracket mounted to depend from said torch support including a portion pivotable about a horizontal axis normal to the workpiece axis, and aligned tangentially with the inside surface of said workpiece; a gear sector mounted on said rotatable portion; limit switch means mounted on said gear sector; limit switch detent means non-rotatably mounted on said bracket; motor drive means to pivot said sector about said axis; and means to de-energize said motor drive means upon contact of said limit switch means with said detent means.

14. An apparatus as defined in claim 13, including means for synchronizing the rotation of said chucking and rotating means with the pivotal movement of said torch bracket.

15. An apparatus as defined in claim 13, including pointer means extending from said bracket pivotable portion in axial alignment therewith adapted to vertically locate said bracket in tangential alignment with the inner surface of said workpiece.

16. An apparatus as defined in claim 1, including solenoid means to vertically shift said cutting torch a predetermined incremental amount following the piercing of a workpiece in said chucking and rotating means.

17. An apparatus as defined in claim 1, including control means to automatically ignite said cutting torch comprising solenoid operable fuel valve means, solenoid operable high voltage electric spark producing means, and means to actuate said solenoid means in predetermined sequence.

18. An apparatus as defined in claim 1, wherein said contour module comprises: a motion generating wheel mounted to rotate about a horizontal axis and driven by said contour driven element; means for synchronizing rotation of said wheel with the rotation of said pipe chucking and rotating means; a first crosshead adapted to traverse horizontally in a plane parallel to said wheel; a vertical slot in said first crosshead; a radially adjustable follower secured to said wheel and positioned in said slot for sliding movement therein; a second crosshead adapted to traverse vertically in a plane parallel to said first-mentioned plane; a connecting rod pivotally fastened at one end to said first crosshead and at the opposite end to said second crosshead; a bell crank mounted above said wheel to pivot about a horizontal axis parallel to the axis of rotation of said wheel; a connecting rod pivotally fastened at one end to said second crosshead, and at the opposite end to one end of said bell crank; and means for fastening the other end of said bell crank to said first output element to shift said first output element horizontally.

19. An apparatus as defined in claim 18, including means to adjust the effective lengths of said connecting rods, the arms of said bell crank, the horizontal locus of said second crosshead, and the radial distance of said follower from the center of said wheel.

20. An apparatus as defined in claim 18, including a pair of levers idly mounted for pivotal movement; connecting means between said other end of said bell crank and one of said levers; connecting means between said one of said levers and the other of said levers; and connecting means between said other lever and said cutting torch to shift said cutting torch in a horizontal plane.

21. An apparatus as defined in claim 1 wherein said mitre module comprises: a motion generating wheel mounted to rotate about a horizontal axis and driven by said mitre driven element; means for synchronizing rotation of said wheel with the rotation of said pipe chucking and rotating means; a first crosshead adapted to traverse horizontally in a plane parallel to said wheel; a vertical slot in said first crosshead; a radially adjustable follower secured to said wheel and positioned in said slot for sliding movement therein; a second crosshead adapted to traverse vertically in a plane parallel to said first mentioned plane; a pair of parallel inclinable guides secured to said second crosshead; a second follower secured to said first crosshead and positioned between said pair of inclinable guides; a bell crank mounted above said wheel to pivot about a horizontal axis parallel to the axis of rotation of said wheel; a connecting rod pivotally fastened at one end to said second crosshead and at the other end to one end of said bell crank; and means for fastening the other end of said bell crank to said second output element to shift said second output element horizontally.

22. An apparatus as defined in claim 21, including a pair of levers idly mounted for pivotal movement; connecting means between said other end of said bell crank and one of said levers; connecting means between said one of said levers and the other of said levers; and connecting means between said other lever and said cutting torch to shift said cutting torch in a horizontal plane.

23. An apparatus as defined in claim 1, wherein said contour module comprises: a motion generating wheel mounted to rotate about a horizontol axis and driven by said contour driven element; means for synchronizing rotation of said wheel with the rotation of said pipe chucking and rotating means; a first crosshead adapted to traverse horizontally in a plane parallel to said wheel; a vertical slot in said first crosshead; a radially adjustable follower secured to said wheel and positioned in said slot for sliding movement therein; a second crosshead adapted to traverse vertically in a plane parallel to said first-mentioned plane; a connecting rod pivotally fastened at one end to said first crosshead and at the opposite end to said second crosshead; a bell crank mounted above said wheel to pivot about a horizontal axis parallel to the axis of rotation of said wheel; a connecting rod pivotally fastened at one end to said second crosshead and at the opposite end to one end of said bell crank; said mitre module comprising: a second motion generating wheel mounted to rotate about a horizontal axis and driven by said contour driven element; means for synchronizing rotation of said wheel with the rotation of said pipe chucking and rotating means; a third crosshead adapted to traverse horizontally in a plane parallel to said wheel; a vertical slot in said first crosshead; a radially adjustable follower secured to said wheel and positioned in said slot for sliding movement therein; a fourth crosshead adapted to traverse vertically in a plane parallel to said third mentioned plane; a pair of parallel inclinable guides secured to said second crosshead; a second follower secured to said first crosshead and positioned between said pair of inclinable guides; a second bell crank mounted above said wheel to pivot about a horizontal axis parallel to the axis of rotation of said wheel; a connecting rod pivotally fastened at one end to said fourth crosshead and at the other end to one end of said second bell crank; a flexible sheath and cable; said sheath being secured at one end to said frame adjacent said other end of one of said bell cranks on one side of said frame; a pair of levers idly mounted on the other side of said frame for pivotal movement; connecting means between said other end of the other of said bell cranks and one of said levers; means to connect the other end of said sheath to said one of said levers; means to connect one end of said cable to said other end of said one of said bell cranks; means to connect the other end of said cable to the other of said levers; and means to connect said other of said levers to said cutting torch to shift said torch in a horizontal plane.

References Cited by the Examiner

UNITED STATES PATENTS 2,334,250  11/43  Cassens et al. _____ 148—9.6

FOREIGN PATENTS 714,685  9/54  Great Britain.

MORRIS O. WOLK, *Primary Examiner.*

JAMES H. TAYMAN, JR., *Examiner.*